US007720714B2

(12) United States Patent
Edwards

(10) Patent No.: US 7,720,714 B2
(45) Date of Patent: May 18, 2010

(54) SYSTEM AND METHOD FOR FACILITATING ELECTRONIC PROCUREMENT BASED ON NEGOTIATED CONTRACTS

(75) Inventor: Jonathan Edwards, Pound Ridge, NY (US)

(73) Assignee: Globalserve Computer Services, Ltd., Valhalla, NY (US)

(*) Notice: Subject to any disclaimer, the term of this patent is extended or adjusted under 35 U.S.C. 154(b) by 2436 days.

(21) Appl. No.: 10/052,900

(22) Filed: Jan. 18, 2002

(65) Prior Publication Data

US 2002/0156695 A1 Oct. 24, 2002

Related U.S. Application Data

(60) Provisional application No. 60/262,799, filed on Jan. 19, 2001.

(51) Int. Cl.
*G06Q 30/00* (2006.01)
(52) U.S. Cl. .............................. 705/26; 705/705; 705/27
(58) Field of Classification Search .................. 705/16, 705/19–34, 400, 402, 409, 500
See application file for complete search history.

(56) References Cited

U.S. PATENT DOCUMENTS

| 5,319,542 | A | * | 6/1994 | King et al. ..................... 705/27 |
| 5,758,327 | A | * | 5/1998 | Gardner et al. ................ 705/26 |
| 5,890,175 | A | * | 3/1999 | Wong et al. ................... 715/505 |
| 5,970,475 | A | * | 10/1999 | Barnes et al. .................. 705/27 |
| 6,338,050 | B1 | * | 1/2002 | Conklin et al. ................ 705/80 |
| 6,850,900 | B1 | * | 2/2005 | Hare et al. ..................... 705/26 |
| 7,155,409 | B1 | * | 12/2006 | Stroh ............................ 705/37 |
| 2001/0056379 | A1 | | 12/2001 | Fujinaga et al. ................ 705/26 |
| 2002/0065736 | A1 | | 5/2002 | Willner et al. ................. 705/26 |

OTHER PUBLICATIONS

"ProCure Partners with Mercator Software to Enable Cost-Effective Supplier Integration to Expanding Number of Ecommerce Channels," Canada Newswire, Ottowa, Oct. 26, 2000. http://proquest.umi.com/pdqweb?TS=10268.
"GlobalServe Announces Full-Service Launch of Global Procurement Web Site for PC Related Products and Services," PR Newswire, New York, Feb. 23, 2000. http://proques.umi.com/pdqweb?TS=10268.
Das Narayandas et al. "Prepare Your Company for Global Pricing," MIT Sloan Management Review, Fall 2000, vol. 42, No. 1, pp. 61-70. http://proquest.umi.com/pdqweb?TS=10268.

* cited by examiner

*Primary Examiner*—Robert M. Pond
(74) *Attorney, Agent, or Firm*—Michael P. Fortkort

(57) ABSTRACT

An electronic procurement session is conducted between a host and a user needing to procure products or services on behalf of an organization. An established contract for the purchase and sales of products/services between a supplier and the organization is the basis for constructing a set of pre-priced items that may be supplied to the organization. A bi-directional electronic communication interface using protocols of the World Wide Web is established between the host and the user and provides the user with access to web-pages which are displayed on the user's computer using a standard Web browser. In response to user information, a subset of the set of pre-priced items is displayed on web-pages and served by the host to the user. Orders for user-selected items from the displayed web-pages are forwarded to a vendor for order fulfillment. The fulfilling vendor and the host have established in advance of the order forwarding that the order will be fulfilled by the vendor in accordance with the terms of the established contract.

11 Claims, 14 Drawing Sheets

Order Review

Your Order currently contains the items below. Please check them carefully before confirming. If you wish you may return to the Shopping Basket to make changes or continue ordering.

[Orders] [Tracking] [Reporting] [Logoff]

Order Country: United Kingdom
Order P.O.: 
Delivery Address: Birstaff
Invoice address: MP (UK) Bracknell

910 — [Return to Basket]  920 — [Confirm Order]

Order Total — Currency: Euros — 588,590.50

| Item | Part # | Item Price | Subtotal | Quantity | Availability |
|---|---|---|---|---|---|
| Entry Level Office Desktop | SM2317 | 1,685.35 | 84,267.36 | 50 | 1 |
| Sales Executive Laptop | 801234 | 3,128.50 | 62,570.02 | 20 | 1 |
| Trading Floor Workstation | MF1776 | 2,457.96 | 2,457.96 | 60 | 2 |
| Work Group Server | MY0666 | 7,356.88 | 294,275.23 | 40 | 3 |

Subtotal for Current Address: 588,590.50

Available = 1
Constrained = 2
Severely Constrained = 3
Remove Item = 4

Order Confirmed

Your Order has been submitted and confirmed as summarized below. You may continue with another e-procurement session, or "Logoff" from the e-procurement session using the button above.

Your Order has been confirmed
Your session tracking number is 1009

Order Country: United Kingdom
Order P.O. 1-08852
Delivery Address: Birstaff
Invoice address: HP (UK) Bracknell Order Total  Destination P.O. 1-4368657

Currency: Euros
588,590.50

| Item | Part # | Item Price | Subtotal | Quantity | Availability |
|---|---|---|---|---|---|
| Entry Level Office Desktop | SW2317 | 1,685.35 | 84,267.36 | 50 | 1 |
| Sales Executive Laptop | BD1234 | 3,128.50 | 62,570.02 | 20 | 1 |
| Trading Floor Workstation | MF1776 | 2,457.96 | 2,457.96 | 60 | 2 |
| Work Group Server | MY0666 | 7,356.88 | 294,275.23 | 40 | 3 |

Subtotal for Current Address: 588,590.50

Available = 1
Constrained = 2
Severely Constrained = 3
Remove Item = 4

Fig. 10

SYSTEM AND METHOD FOR FACILITATING ELECTRONIC PROCUREMENT BASED ON NEGOTIATED CONTRACTS

This Application claims the benefit of U.S. Provisional Application No. 60/262,799 filed on Jan. 19, 2001. The invention relates to electronic procurement conducted between a host and a user via a communication network including unitary networks and distributed networks such as the Internet.

BACKGROUND OF THE INVENTION

Summary of the Invention

The present invention provides an electronic procurement ("e-procurement") session that is conducted between a host and a user needing to procure products or services on behalf of an organization. A contract for the purchase and sale of products/services established between a supplier and the organization prior to the e-procurement session is the basis for constructing a set of pre-priced products/services that may be potentially supplied to the organization. A communications link is established between the host and the user, and in response to user data, a subset of the set of pre-priced products/services is provided by the host to the user. Orders for user-selected items from the subset are forwarded to a vendor for order fulfillment consistent with terms of the pre-established contract.

In preferred embodiments of the invention, using protocols of the World Wide Web, an electronic procurement session is established between the host and the user. The user is served with web-documents i.e., Hypertext ("HTML") documents, forming an interactive on-line catalog which are displayed on the user's computer using a standard web-browser. Catalog entries, including product/service listings and pricing, are provided to the user consistent with the terms of a pre-established original equipment manufacturer ("OEM") contract or company standard.

Product/service inventory levels and availability, currency conversions, exchange rate, duties, tariffs and taxes, and shipping and handling charges, among other transaction parameters, are determined according to user location or other user data, and displayed to the user in a user-selectable language. Employing the Web browser, users interactively navigate links and web-documents in the on-line catalog, which provide related or more detailed information. Users may select items for procurement (up to a pre-authorized spending limit) employing a user-viewable electronic shopping basket.

Users may designate transaction parameters such as order quantity, delivery address, and purchase order number by selectively interacting with icons, buttons, menus, data fields and the like displayed by the Web browser. Instructional information may be accessed by selecting an on-line assistance (i.e., "help") option.

The host forwards the contents of the shopping basket to a fulfillment vendor, which may include distributors and value-added-resellers ("VARs"). In accordance with an agreement with the host, the order is fulfilled by the vendor so that price and other terms of the pre-established contract or company standard are satisfied.

The user may also engage the e-procurement session to search the on-line catalog by product/service, product/service category, and manufacturer, as well as track orders and receive reports including amounts spent by delivery address, country, manufacturer, and total amount.

E-procurement provides a number of advantages. The host's e-procurement communication portal or website may be accessed by users around the world and thus provides the company with a secure, centrally and consistently managed, single point-of-contact for procuring products and services against contracts that often have complex pricing and discount structures. This feature is particularly advantageous when a basket of products or services is procured against multiple contracts with multiple vendors. Companies can readily track spending levels and delivery performance across a range of products and a multitude of suppliers to audit compliance with contract terms and thus ensure it is getting the benefit of its bargain with its suppliers. In addition, global adherence to company-dictated standards and specifications for the purchased products/services is enhanced through e-procurement which substantially reduces procurement costs and costs associated with user training and equipment maintenance.

The on-line catalog aspect of e-procurement provides additional advantages. The on-line catalog may be kept current though dynamic updates to accommodate changing item listings, pricing, and user requirements. Such advantage may be particularly realized in fast-evolving or upgradable products such as information technology.

The e-procurement portal is positioned "above-country" by virtue of its ability to tailor catalog entries and information to the requirements of the local "in-country" user, in compliance with local law and customary business practices, regardless of geographic location. Thus, the burden of sourcing, selecting, and managing of products/services is lifted from the company. By ensuring local fulfillment of orders through a network of distributors, vendors, and VARs in accordance with the pre-set pricing and other contract terms, e-procurement effectively eliminates the fragmentation in the supply chain which drives up costs from delays in purchasing and delivery. Companies can reduce or eliminate altogether investing in their own infrastructure (i.e., plant, property and equipment) to support supply chain management by using the features and advantages provided by e-procurement.

Other feature and advantages of e-procurement will become apparent from the figures, the description, and the claims.

BRIEF DESCRIPTION OF THE DRAWINGS

FIGS. 8-12 depict various illustrative web-documents used in e-procurement.

DESCRIPTION OF THE PREFERRED EMBODIMENTS

Figure 1:
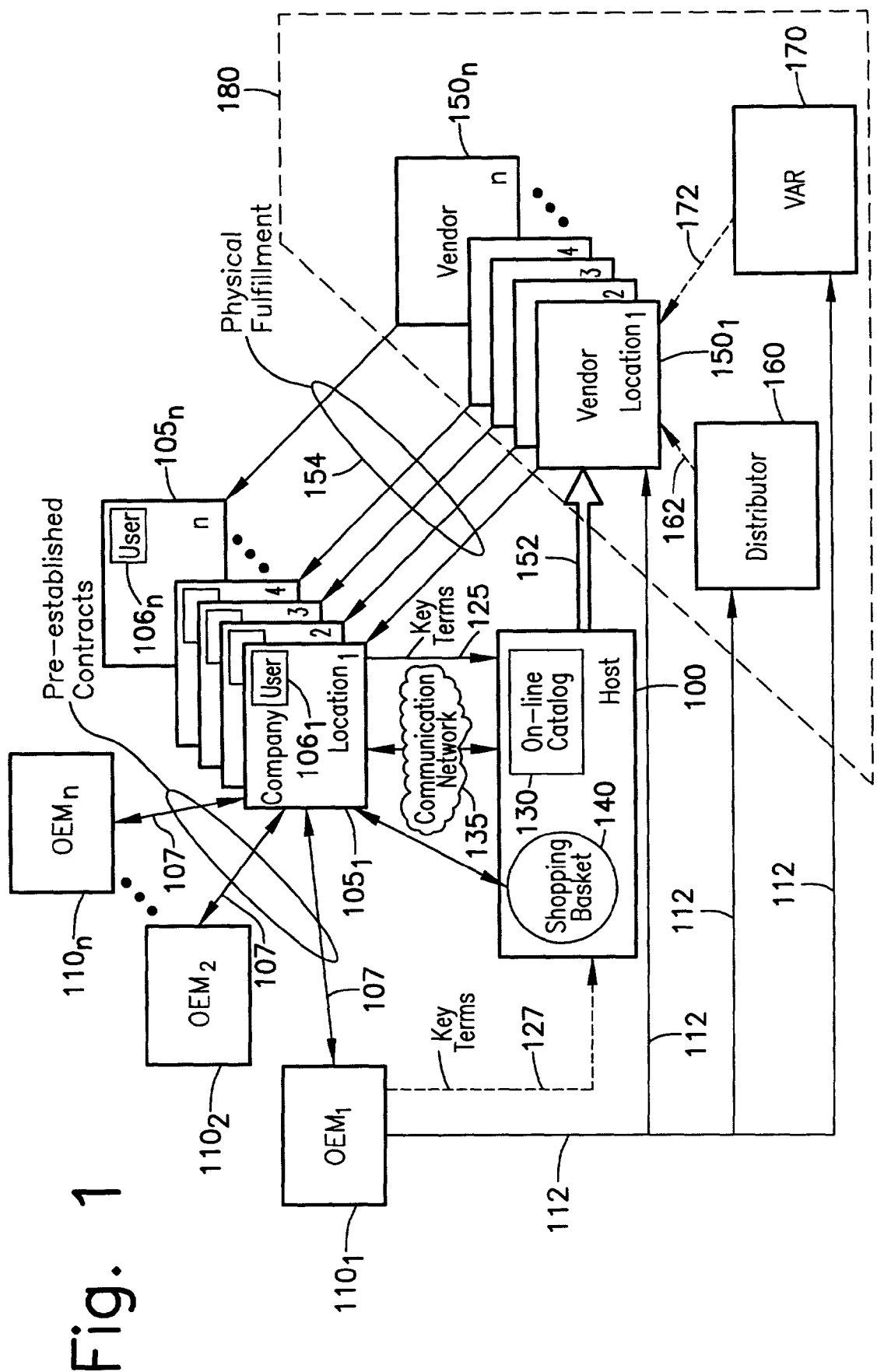
FIG. 1 is a diagram depicting the relationship among original equipment manufacturers, vendors, a company, and an e-procurement host.

Referring to FIG. 1, a host 100 provides e-procurement to a company 105 to enable it to quickly and efficiently procure products or services against pre-established contracts with one or more with original equipment manufacturers ("OEM") $110_1$, $110_2$, . . . $110_n$. The host 100 collects key terms 125 extracted from the pre-established contracts such as a list of products/services that may be purchased under the contracts and pricing for those products/services. The key terms may be received from either party to the pre-established contract, that is, either the company 105 or the OEMs 110.

The host 100 creates an on-line catalog 130 using the key terms depicted on line 125 and provides users 106 within the company (who may be located in different locations 1, 2, . . . n throughout the world) with electronic access to it over a communications network 135. The interactive on-line catalog 130 is configured to display the key terms 125 in a form that is customizable according to the user.

For example, the on-line catalog 130 may display the unit price of a country-specific item (such as a 220 volt AC adapter with the correct plug configuration for a notebook computer ordered and used in Europe) purchasable against the pre-established contract in the currency that is appropriate for ordering country, taking into account the exchange rate, applicable OEM discounts, adjustments, taxes, tariffs, and the like.

The host 100 takes orders for those products/services selected from the online catalog 130 by the user (using an electronic shopping basket 140) and forwards the orders for physical fulfillment to a vendor 150 as indicated by line 152 in FIG. 1. The vendor 150 is typically situated in convenient geographic location to the ordering user and physically fulfills the order to the user while honoring the key terms of the pre-established contract, most notably price and delivery terms.

At this point, an introductory overview is presented which may be helpful to place this description of the preferred embodiments in context for the reader.

Procurement of those products/services which satisfy a recurring need by businesses represents a substantial expense and burden, particularly for companies that conduct operations in multiple locations or countries. Procurement as used here means a multi-step purchasing process, from ordering through to physical fulfillment of the purchased product/service, including the steps of selecting, ordering, and receipt of delivery. Such companies may often contract at a high corporate level with large suppliers having the broadest product/service offerings and geographical reach in order to gain price advantage through the economies of scale realized by volume purchasing.

In the case of technology procurement, large suppliers may also be best situated to provide a leading edge solution or other feature set that is particularly required by the company. Volume purchases may also benefit the company as operating costs are often reduced through standardization of infrastructure. For example, with information technology like personal computers, the establishment of, and adherence to, corporate standard or guidelines for approved computer platforms or packages minimizes issues with technology and software compatibility. In addition, the implementation of corporate standards can reduce costs associated with user training and equipment maintenance.

A company may enter into a contract with a supplier that is negotiated and executed by organization tied to corporate headquarters, for example, a corporate purchasing department. Such a contract may be termed a "global" or "umbrella" type supply contract as it is intended to benefit the entire company, including the typical branch and subsidiary operations of the company (which may literally be located all over the globe).

A global supply contract establishes a mutually beneficial relationship between the supplier and the company. The typical "preferred supplier" terms included in global supply contracts help the supplier manage its production and inventory levels (by virtue of the security a long term supply contract provides), but may also give the supplier an advantage in bidding on potential new company business (for example, through advance notice of request-for-quotes by the company).

The typical "preferred customer" terms help the company to establish and maintain corporate advantage by having a reliable source of supply of products that may otherwise be subject to shortage. Such shortages can be particularly felt with high-technology products, such as information technology, where product life-cycles tend to be short. Where uninterrupted supply is a strategic imperative for the company, a number of global supply contracts with multiple alternate suppliers are generally utilized. Preferred customer terms, for example, may provide the company with price protection for a period of time, or pricing that is guaranteed to be no higher than that provided to a competitor to the company (so called "most favored customer" terms).

Global supply contracts may often be very complex. Administering and managing the procurement of products/services against the contract can be difficult and costly. Companies, while creating global strategies to benefit the business as a whole, are still required to execute global supply contracts at the local level. For multinational companies in particular, such local execution of global contracts that were negotiated at corporate headquarters can be additionally burdened with language barriers, time-zone differentials, and issues pertaining to local laws and regulations and customary business rules or practices. Global supply contracts can also suffer inherently with problems posed "one size fits all" approach. Global terms and conditions may have unintended effects when applied to unforeseeable local conditions.

Dealing with global supply contracts is problematic not only because of the inherent difficulties with local execution of contracts with global impact. For example, in the case of information technology, the products potentially supplied against the contract may include large universe of items, models, and accessories that can be arranged in a myriad of configurations in response to company specifications that may vary according to type of end user, location, connectivity requirements, and other factors.

A global supply contract between a company and a major OEM of information technology may cover terms for the purchase and supply of servers, storage systems, networking equipment such as hubs, switches and routers, cable and wiring, end-user computers including desktops and workstations, laptop computers, accessories, software, documentation, training materials, and related equipment such as racks, printers, scanners, microphones, cameras, keyboards and monitors, to name just a few examples. In addition, many of the equipment types listed above can be arranged in multiple configurations. Memory, storage, processor speed, port configuration, expansion capability, network connectivity and many other equipment specifications can be varied. The large number of combinations and permutations of equipment configurations that can purchased against the contract can represent a significant element of complexity to the contracting and procurement process.

The complexity of the procurement process is compounded when a corporate standard incorporates products/services from multiple suppliers or when user's needs are such that products/services are required to be purchased against multiple global supply contracts. For example, a corporate standard or approved computing platform may use a central processing unit from one OEM and peripheral equipment from another. Similarly, users often have complex and varying needs that may require a multi-supplier approach. Lastly, as is often the case with fast evolving or upgradable technologies, companies often cannot remain competitive by sourcing information technology solutions from a single supplier. As a consequence, procurement costs often rise as companies try to implement procurement in-country against multiple global contracts.

Global supply contracts can often incorporate very complex pricing and discount structures. Pricing as used here means the selling price for a product before any discounts are applied. Discounts on pricing are typically given by the supplier to the company as total purchases against the contract reach set agreed upon targets. Net selling price is the term applied to the discounted price, exclusive of taxes.

A number of pricing methodologies may be utilized by global supply contracts. Pricing may vary for similar products according to such factors as country of delivery, individual order size, FOB point, local laws and regulations, and customary business rules or practices. Pricing may also vary due to differences in products themselves or specific configurations that may be required to meet the local conditions. For example, a power adapter for a notebook computer used in E.U. may have a higher price as it is bundled with a number of plug adapters and uses a 220 volt power supply. Or, Japanese specification computer monitors may be priced lower than European specification computer monitors of the same size and feature set due to different European Union regulations covering electromagnetic radiation emissions.

The delivered price for products/services procured against a global supply contract is also subject to variation. Delivered price as used here means the net selling price (selling price minus supplier discounts) of a product/service after taking into account government-based fees (such as taxes, tariffs, and duties), miscellaneous fees (such as shipping, handling and insurance fees), and any of the myriad of adjustments to price that may be provided by the supplier or be included within the terms of the global supply contract. Supplier adjustments typically include those resulting from the provision of substitute products and adjustments that might result from a repair, warranty claim, or product exchange. Contracted adjustments typically include those dictated by fluctuations in exchange rates, inflation, shortages of materials, force majeure events, preferred supplier/customer terms and the like.

The vast universe of potentially suppliable products/services and complex pricing methodologies covered by global supply contracts, in combination with varying in-country rules make it a challenge for companies to consistently procure against the contract in all operating locations. In-country users are traditionally burdened with the task of sorting out the appropriate products/services for their location and determining the price called for under the terms of the global contract or multiple contracts. And, as previously discussed, such global contracts have inherent problems with local execution.

Frustration with this cumbersome process can reach a point where in-country users may bypass the global supply contract and deal directly with a local vendor. The procurement process may indeed be smoother in these situations due to good in-country knowledge of the local vendor, but at the expense of potentially higher prices and non-conformance with corporate standards.

Difficulties in locally executing global supply contracts do not stop with the problems in managing contracts having complex pricing schema with one or more suppliers. Physical fulfillment of the products/services procured against global supply contracts also presents enormous challenges to companies, again, particularly those that are multinational.

OEMs, particularly technology manufacturers, still heavily rely on legacy distribution channels including those in the United States, but also notably those in the rest of the world. VARs and distributors are the dominant last links in the supply chain as they are well situated for distribution and fulfillment as a result of strong in-country knowledge. Such entities also traditionally have large investments in in-country distribution infrastructure such as warehousing, communications, and transportation facilities. While some VARs and distributors may be multinational, the requirement for strong in-country knowledge and OEM preferences have resulted in a supply chain that is characterized by numerous VARs and distributors within a country that do business principally in that country.

However, while rendering valuable fulfillment services, these distribution channels are separate and distinct from the OEM which results in a highly fragmented market. OEMs, VARs and distributors generally maintain disparate business and information systems, and do not share fully aligned strategic interests as each wants to maximize its own profitability, which may come at the expense of the company.

For example, VARs run the risk of being squeezed between the OEM and end-customer who, as discussed above, may prefer to buy direct from their global contracts. VARs, facing the prospect of unattractive margins in such situations, may not fully address the needs of the company. In addition, the in-country VAR or distributor is often unable to fully coordinate support services such as disposition of warranty claims and other customer service issues with the OEM.

The inherent lack of in-country knowledge by the OEM further compounds the issues with supply chain fragmentation. As a result, it can be difficult and costly for a company to track individual purchase orders and generate reports for global spending on a particular category of products/services that may cut across many countries and involve multiple global supply contracts. Tracking and reporting are very helpful to a company in managing costs and auditing both company and supplier compliance with global supply contract terms, among their other benefits.

Supply chain fragmentation directly increases the cost of procurement for companies. Not only are increased tangible costs readily identified as a direct result of fragmentation, but intangible costs are borne which are related to inefficiencies within the traditional procurement process. These inefficiencies may lead to loss of time, lack of productivity, frustration, and the slowing of work flows and business processes.

These increased procurement costs can be troublesome for companies in the global economy that must coordinate their international activities to remain competitive. Emerging and growth companies are expecting to quickly establish operations in a multitude of countries so the lack of a consolidated supply chain which operates across borders has proven frustrating.

To summarize the introductory overview, procurement and supply chain management present major challenges to companies. Procuring products/services against global supply contract in all countries of operation is difficult due to the large number of products/services that may be supplied and complex pricing and discount structures. Language and time zone differentials and varying in-country business practices, regulations, and law cause additional administrative difficulties in the procurement process for in-country users. Finally, supply chain fragmentation may cause costly delays at the point of physical fulfillment of the ordered products/services.

The following terms and acronyms are used throughout the description that follows:

1. Internet.

A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

2. World Wide Web ("Web").

Refers generally to both (i) a distributed collection of interlinked, user-viewable hypertext documents (commonly referred to as "Web documents" or "Web pages") that are accessible via the Internet, and (ii) the client and server software components which provide user access to such documents using standardized Internet protocols. Currently, the primary standard protocol for allowing applications to locate and acquire Web documents is HTTP (discussed below), and the Web pages are encoded using HTML (also discussed below). However, the terms "Web" and "World Wide Web" are intended to encompass future markup languages and transport protocols which may be used in place of (or in addition to) HTML and HTTP.

3. Client-Server.

A model of interaction in a distributed system in which a program at one site sends a request to a program at another site and waits for a response. The requesting program is called the "client," and the program which responds to the request is called the "server." In the context of the World Wide Web, the client is a "web browser" which runs on a computer of a user; the program which responds to browser requests by serving Web pages is commonly referred to as a "web server."

4. TCP/IP (Transmission Control Protocol/Internet Protocol).

A standard Internet protocol (or set of protocols) which specifies how two computers exchange data over the Internet. TCP/IP handles issues such as packetization, packet addressing, handshaking and error correction.

5. HTML (HyperText Markup Language).

A standard coding convention and set of codes for attaching presentation and linking attributes to informational content within documents. During a document authoring stage, the HTML codes (referred to as "tags") are embedded within the informational content of the document. When the Web document (or "HTML document") is subsequently transferred from a Web server to a browser, the codes are interpreted by the browser and used to parse and display the document. In addition to specifying how the Web browser is to display the document, HTML tags can be used to create links to other Web documents (commonly referred to as "hyperlinks").

6. Port or Port Number.

(Also referred to as "socket number.") In the context of the Internet, a numerical identifier (normally provided in conjunction with an IP address) which is used by TCP/IP to direct incoming data to a particular application. Certain ports have been reserved by the Internet Assigned Number Authority (IANA) for certain applications. For example, port 80 is reserved for HTTP, and is used on Web sites to direct incoming traffic to a Web server. (See "URL" below.)

7. URL (Uniform Resource Locator).

A unique address which fully specifies the location of a file or other resource on the Internet. The general format of a URL is protocol://machine address:port/path/filename. The port specification is optional, and if none is entered by the user, the browser defaults to the standard port for whatever service is specified as the protocol. For example, if HTTP is specified as the protocol, the browser will use the HTTP default port of 80.

8. HTTP (Hypertext Transport Protocol).

The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document or file located at the specified URL.

9. HTTP POST.

A type of HTTP message which is used to request that the Web server accept information from the Web client. This information may, for example, be in the form of a database submission which is executed by a CGI script. (See "CGI" below.)

10. MIME (Multipurpose Internet Multimedia Extensions) Type.

A file extension or attachment which specifies the type or format of the file (e.g., HTML, text, graphics, audio, etc.). MIME typing allows the Web browser to determine how to process a file that is received from a Web server. For example, a file of MIME type HTML (extension ".htm" or ".html") will be displayed by the browser, while a file of MIME type X-WAV (extension ".wav") will typically be passed to an audio player which can handle the Microsoft WAV format. Standard Web browsers come pre-configured to handle popular MIME types. In addition, standard Web browsers can easily be configured by the user to handle new MIME types; this typically involves specifying the file extension of each new MIME type, and specifying the path and filename of the application (referred to as a "MIME handler") to which files of such type should be passed.

11. Internet Firewall.

A security system placed between the Internet and an organization's network (such as a local area networks ("LANs")) to provide a barrier against security attacks. Internet firewalls typically operate by monitoring incoming and/or outgoing traffic to/from the organization's network, and by allowing only certain types of messages to pass. For example, a firewall may be configured to allow the passage of all TCP/IP traffic addressed to port 80, and to block all other traffic.

12. CGI (Common Gateway Interface).

A standard interface which specifies how a Web server (or possibly another information server) launches and interacts with external programs (such as a database search engine) in response to requests from clients. With CGI, the Web server can serve information which is stored in a format that is not readable by the client, and present such information in the form of a client-readable Web page. A CGI program (called a "CGI script") may be invoked, for example, when a Web user fills out an on-screen form which specifies a database query.

Referring again to FIG. 1, the figure depicts functional relationships among the entities that may be involved in e-procurement. OEMs 110 may comprise suppliers of products or services of any type, however, they would typically be manufacturers of products, the originating entity for services, or other upstream supplier that can provide some benefit to the company 105 by entering into a supply contract.

Such manufacturers and originating entity generally, through manufacturing efficiencies or economies of scale, are sufficiently focused to offer economic incentives to customers to warrant the burden of supply contract management and administration. However, the depiction of OEMs 110 in FIG. 1 is merely illustrative, and other entities such as distributors, resellers, subcontractors and similar entities that occupy positions further downstream in the supply chain may also participate in e-procurement.

In the illustrative embodiment of FIG. 1, n OEMs are depicted because companies are often in situations where multiple contracts with multiple vendors are required to meet company objectives. Using the example of information technology, company 105 may choose multiple OEMs to guarantee adequate supplies of fast-evolving technology and achieve a custom solution resulting from a combination of products from multiple suppliers. Companies may use multiple suppliers to leverage advantage in commercial terms that may result from such competitive arrangements. However, the benefits of e-procurement may be derived from either single supplier or multiple supplier situations, as described more fully below.

The company 105 may be virtually any entity or organization that has sufficient recurring procurement needs to justify entering into a supply agreement. In the illustrative embodiment depicted in FIG. 1, company 105 may be a large multinational corporation having recurring information technology procurement needs that are typical for companies employing a relatively high percentage of knowledge or technical workers. Company 105 further has n locations, as shown, distributed in various countries. It is noted that while e-procurement is equally beneficial to single-location companies, a multinational company is used in this illustrative embodiment to highlight the full range of features provided by e-procurement.

Contracts between OEMs 110 and company 105 are depicted by lines 107 in FIG. 1. The contracts are typically established between the OEMs 110 and company 105 in advance of any e-procurement sessions conducted between the company 105 and host 100. Thus, they are referred to as "pre-established." However, both the contract type and degree of pre-establishment may be tailored to the particular e-procurement application. The contract may simply be a common understanding, written or otherwise, between the parties of key terms for the purchase and sale of product/services at some agreed upon price. Or, the contract may be as complex as the global supply contract described in the introductory overview above. In either case (as well as for those in-between the two extremes), some degree of pre-establishment of key terms of the understanding between the OEM and company is generally desirable to facilitate e-procurement without the added burden of managing negotiations in real-time.

Communication network 135 is used to establish a communication link between the company 105 and host 100. It is generally of benefit that the communications be bi-directional to allow information to be sent and received by the parties, but uni-directional communication from the host 100 to company 105 may be useful in some e-procurement applications. In those cases, company 105 may view an on-line catalog displaying key contract terms, but ordering or other communications with the host would be accomplished off-line or established using an alternative communication method.

Communication network 135 may comprise wired and wireless networks, both public and private, or combinations of these network types. Communication network 135 may also include distributed networks such as the Internet, or unitary networks such as local area networks that are typically operated by a single operator. In the illustrative embodiment of FIG. 1, company 105 and host 100 are coupled via communication network 135 in the form of the Internet utilizing protocols of the World Wide Web.

Both client and server connections at the host and company locations to communication network 135 are typically arranged in a secure manner so that network 135 operates as a secure extranet (an internet closed environment) to internal communications resources of company 105, including firewall-equipped LANs. In some applications of e-procurement, security is maintained by requiring the production of login and password credentials upon access to the e-procurement web-site.

Key terms of the contracts between OEMs 110 and company are provided by the company, as depicted on line 125 in FIG. 1 to the host 100. Key terms 125 may include any number of elements, but in most e-procurement applications would at least encompass the basic elements of contract, namely what the seller is selling, and for what price. Thus, key terms 125 would generally include a list of products/services that the OEM 110 has agreed to sell to company 105 and the selling price associated with each listed product/service.

Key terms may be provided by either party to the contracts 107. Thus, as shown in FIG. 1, key terms are shown being received on both line 125 (from the company) and line 127 (from the OEM $110_1$). It is noted that key terms may be received from the other OEMs 110, 2-$n$, but this is not indicated in FIG. 1 for sake of clarity in presentation. Likewise, key terms on line 125 could be received from company 105 locations 2-$n$.

The key terms 125 from the contracts 107 are used by the host 100 to generate the on-line catalog 130, as described in more detail below. However, it should be noted that the on-line catalog 130 may include listings for products/services not covered by any contract or agreement with OEMs 110, or otherwise. That is, the company 105 may wish to provide company users with an ability to procure, track, or manage information pertaining to items not potentially supplied by OEMs 110 under pre-established terms. For example, OEMs 110 may offer products/services that are still useful to the company but no pre-established pricing arrangement has been set between the company and OEM.

As described in the introductory overview, companies often establish corporate guidelines or lists of products, or combinations of products (a "bundle") approved for purchase in order to reduce costs through standardization. For example, a corporate information technology department may specify a standard platform for travel computers to reduce maintenance costs for such equipment having relatively high frequency of repairs (where costs are reduced through reductions in replacement parts inventories and gains in labor efficiencies that results from fewer supported models).

Figure 2:
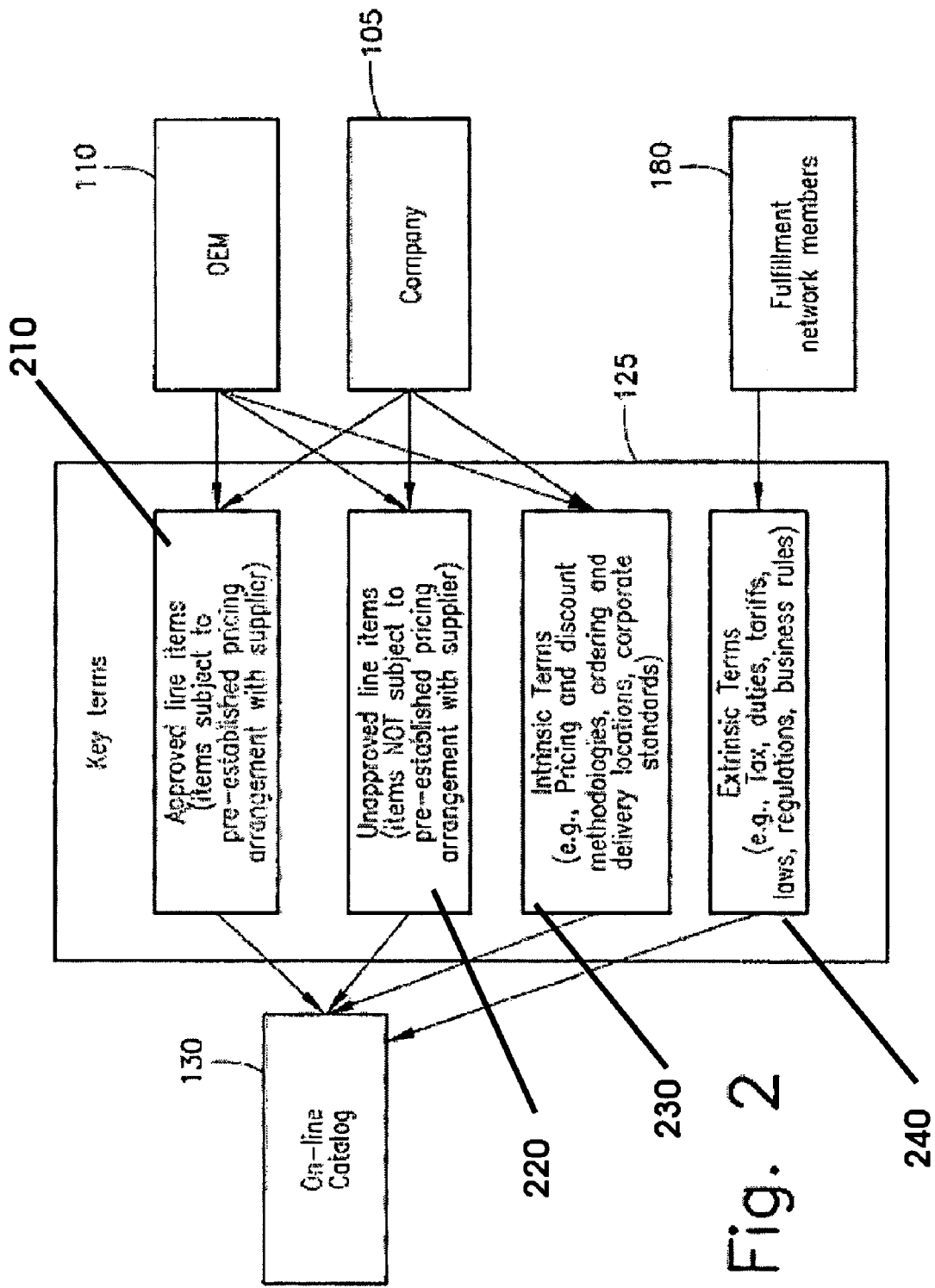
FIG. 2 is a diagram depicting key terms used with an on-line catalog in e-procurement.

Thus, a global supply contract may cover critical elements of the corporate standard platform to ensure availability of supply and lock in price protection for the company, but other, perhaps less critical or widely available commodity-type elements are procured under variable or negotiated pricing. As used here, the term "approved line item" means a product/service for which the company has entered into a pricing arrangement with a supplier such as OEMs 110. "Unapproved line item" means a product/service for which the company has not entered into a pricing arrangement with a supplier. Both approved and unapproved line items may be included in on-line catalog 130. Accordingly, key terms 125 may include information and data about both approved and unapproved line items. The inclusion of both approved line items 210 and unapproved line items 220 in on-line catalog 130 is shown in FIG. 2.

While the key terms 125 generally include item listing and pricing, some e-procurement applications may use other data to generate the on-line catalog 130. In these applications, additional customization of the on-line catalog according to the user, company, supplier, or other factors may be desirable. As shown in FIG. 2, other data may be supplied by the OEM 110 or company 105 as part of the key terms 125. Such data may include, for example, pricing and discount methodologies, ordering and delivery locations of the company, corporate standards, tax and tariff data, user profiles, spending limits and other information that allows the host 100 to establish rules for catalog construction.

Thus, the key terms 125 include terms 230 that are intrinsic to the contracts 107 (such as item listing and pricing which may be extracted directly from the contract) and extrinsic terms 240 that are derived indirectly from the contract or are a consequence of implementation of the contract (for example, taxes, duties, tariffs, laws, in-country business rules). It should be noted that the vendors 150, distributors 160 and VARs 170 (FIG. 1) may also be advantageously employed as sources of extrinsic terms due to their comprehensive in-country knowledge, as shown in FIG. 2.

Referring back to FIG. 1, on-line catalog 130 is accessed, via communication network 135, during an e-procurement session provided by host 100 to user 106 in company 105. Orders taken by host 100 are forwarded, as depicted on line 152, to vendor 150 for physical fulfillment of the ordered product/service. As indicated in FIG. 1, a single vendor 150 may be used by host 100 for order fulfillment, or a larger number of vendors 150 may be used in e-procurement applications. A multi-vendor approach may be desirable in situations where the company has multiple locations, as is the case with the illustrative embodiment shown in FIG. 1. In such cases, an efficient mapping of the multiple vendors to company locations may offer substantial economic benefit. For example, if company locations $105_1$, $105_2$, and $105_3$ are located in London, Paris, and Frankfurt, vendors $150_1$, $150_2$, and $150_3$ may be selected to be in same city or nearby city as the company location in each respective country. However, one-to-one mapping between vendor and company location is not required, and vendors may be selected to serve multiple company locations across multiple borders.

Distributor 160 and VARs 170 along with vendors 150 constitute fulfillment network 180. It is noted that the term "vendor" as used here is a generic term meaning any entity that is capable of fulfilling a procurement order from the company 105 while meeting the terms called for by the pre-established contracts 107, including pricing. Therefore, vendors 150 may include, but are not necessarily limited to traditional VARs and distributors. These are terms that are more specifically defined as used in this description. VARs are entities which sell OEM-sourced products/services to end-users customers such as the company 105 in this illustrative embodiment. The OEM-sourcing of products/services to the distributor 160, VAR 170 and vendor 150 is indicated by line 112 in FIG. 1.

VARs typically provide a "front-end" sales channel for the OEMs by providing, in addition to products/services themselves, related services to the customer such as providing product selection advice and installation, return and repair and warranty service. Distributors are entities which sell OEM-sourced products/services but typically without the related services. Regardless of the specific suite of products/services that may be provided, the distributors 160, VARs 170 and vendors 150 shown in FIG. 1 are related, as indicated by lines 162 and 172, by their common ability to physically fulfill e-procurement orders to the company 105 in accordance with contracts 107. In the illustrative embodiment of FIG. 1, physical fulfillment between fulfillment network 180 and company 105 is indicated by lines 154 which shows an illustrative one-to-one mapping between vendors $150_{1-n}$ and company locations $105_{1-n}$. However, it is emphasized again that different mapping configurations for physical fulfillment may also be used in other e-procurement applications, and moreover, while not shown in FIG. 1, physical fulfillment may also be effected by VAR 170 and distributor 160 using a variety of mapping configurations.

Host 100 and fulfillment network 180 may have a contractual or non-contractual relationship. Contractual relationships, while more common in business, are not required in all e-procurement applications. In either case, fulfillment network members (including VAR 170, distributor 160 and vendors 150) will physically fulfill procurement orders for OEM-sourced products/services placed by company 105 with host 100 consistent with contracts 107. Typically, this duty will be discharged by the fulfillment network 180 simply by matching the pre-established price set forth in the contract, but other significant commercial terms and conditions may also be required to be satisfied by the members of fulfillment network 180. The terms and conditions required to be satisfied (which may include key terms 125) are provided by host 100 to fulfillment network members as indicated by line 152 in FIG. 1 (delivery of such terms and conditions may also be made to VAR 170 and distributor 160, but this is not shown in FIG. 1 for the sake of clarity in presentation).

The inclusion of VARs and distributors (collectively referred to simply as VARs) within fulfillment network 180 takes advantage of the dominant role these legacy distribution channels play in many markets. Not only do the VARs have embedded infrastructure, property, plant and equipment, in many locations, they often have a history of strong customer relationships. And, as discussed in the introductory overview, VARs bring substantial in-country knowledge to the fulfillment network 180. Thus, through the establishment and use of fulfillment network 180, company 105 sidesteps the traditional problem with supply chain fragmentation and realizes the benefit of the embedded infrastructure in fulfilling its procurement order for the OEM-sourced product/service at the contracted price.

Unlike the situation that can occur between the OEM and VAR where strategic interests may not be fully aligned, the members within the fulfillment network 180 have well aligned interests with host 100. By protecting the margin of the vendor 150 at the expense of the willing OEM (as discussed below), the vendor 150 is fully incentivized to exercise its embedded infrastructure for physical fulfillment at the contracted price. In addition, the vendor 150 is realizing additional sales without the incremental expenditure of sales and marketing efforts which further enhances the benefits of membership in the fulfillment network 180. Host 100 may also enhance, through its delivery of required terms and conditions of the contracts 107 between OEMs 110 and company 105, the vendor's ability to deliver cross-border (i.e., international) solutions to the company or other potential customers.

The OEMs 110 and host 100 may also share aligned strategic interests through e-procurement. OEMs 110 generally desire to fully discharge their obligations under contracts 107 to company 105 and may view host 100 as an important ally in accomplishing this objective. By creating an electronic link between the fulfillment network 180, with its superior in-country knowledge, and the OEMs 110, e-procurement facilitates the delivery of more OEM-sourced product into the market that are well tailored to fully meets customer expectations.

The strategic alignment shared between the host and both OEMs and vendor may facilitate the collection of fees from either or both by the host. For example, OEMs and vendors gain the benefits described above when participating in e-procurement and thus may be willing to pay fees or commissions to the host in exchange. In addition, as the company benefits by e-procurement as a result of lower procurement costs, economic incentives exist for the host to provide e-procurement to companies on a subscription or per-transaction basis.

Figure 3:
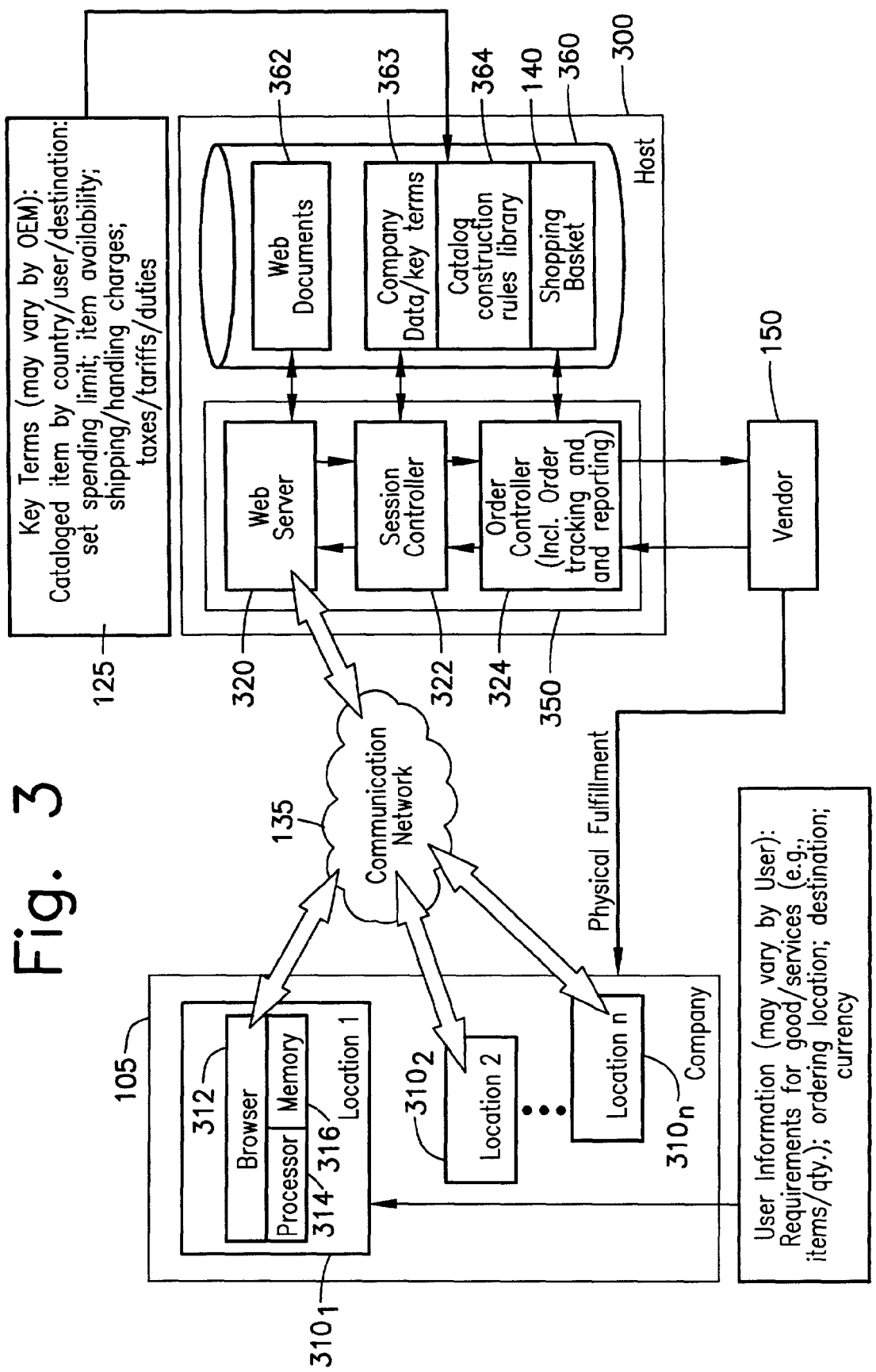
FIG. 3 illustrates details of an embodiment including a user computer communicating with a host's e-procurement website.

FIG. 3 illustrates details of an illustrative e-procurement embodiment including a user computer 310 communicating with the host web-site 300. User computer is conventionally configured with a processor 314 and memory 316. User computer 310 runs a client software application, such as web-browser 312, which allows the user to access and browse the on-line catalog 130 (FIG. 1) that is accessed, in this illustrative embodiment, over the World Wide Web (communication network 135). The browser 312 interprets the web-documents, which may be coded HTML documents, served by host web-site 300 and creates on the user's computer monitor (not shown) a page-oriented representation of the document. E-procurement supports multiple user computers 310 located in various company locations 1, 2 . . . , n, as shown in FIG. 3 (detail of computers $310_2$ and $310_n$ are omitted for clarity).

User-selectable options, or hypertext links, are presented within the web-documents to implement icons, buttons, data fields, menus and the like to allow user computer 310 to transmit requests to web server 320 and retrieve and transmit additional web-documents which provide related or additional information. The user 106 (FIG. 1), using the browser 312, navigates additional hypertext links and browses additional web-documents which form the on-line catalog 130.

The host web-site 300 in FIG. 3 comprises a processing unit 350 and data storage device 360. The data storage device 360 is divided into storage areas for web-documents 362, company data and key terms (collectively referred to as company data 363), catalog construction rules library 364, and shopping basket 140. Processing unit 350 is divided by function into web server 320, session controller 322, and order controller 324. Processing unit may comprise a single or multiple computing devices. While separate server and processor devices and functions are described here to aid in the description of the illustrative e-procurement embodiment, it is noted that web-server, session controller, and order controller functions may be readily performed by fewer devices or a single device, if desired.

Similarly, data storage device 360 may conveniently be arranged as a single mass storage device or array of such devices. In addition, while a single web-server is shown in FIG. 3, it will be recognized that other configurations employing multiple servers may be advantageously used in some e-procurement applications. Software operates on host web-site 300 including web-server software and catalog construction software for implementing the rules library 364.

The web-documents 362 served by web server 320, when received by web-browser 312, display various icons, buttons, data fields, menus and like forming user-selectable options which correspond to procurement transactions, as well as text or graphic images comprising the content of the web-documents. Web-documents 362 are configured to form on-line catalog 130 which offer users 106 (FIG. 1) with a range of procurement options.

Figure 4:
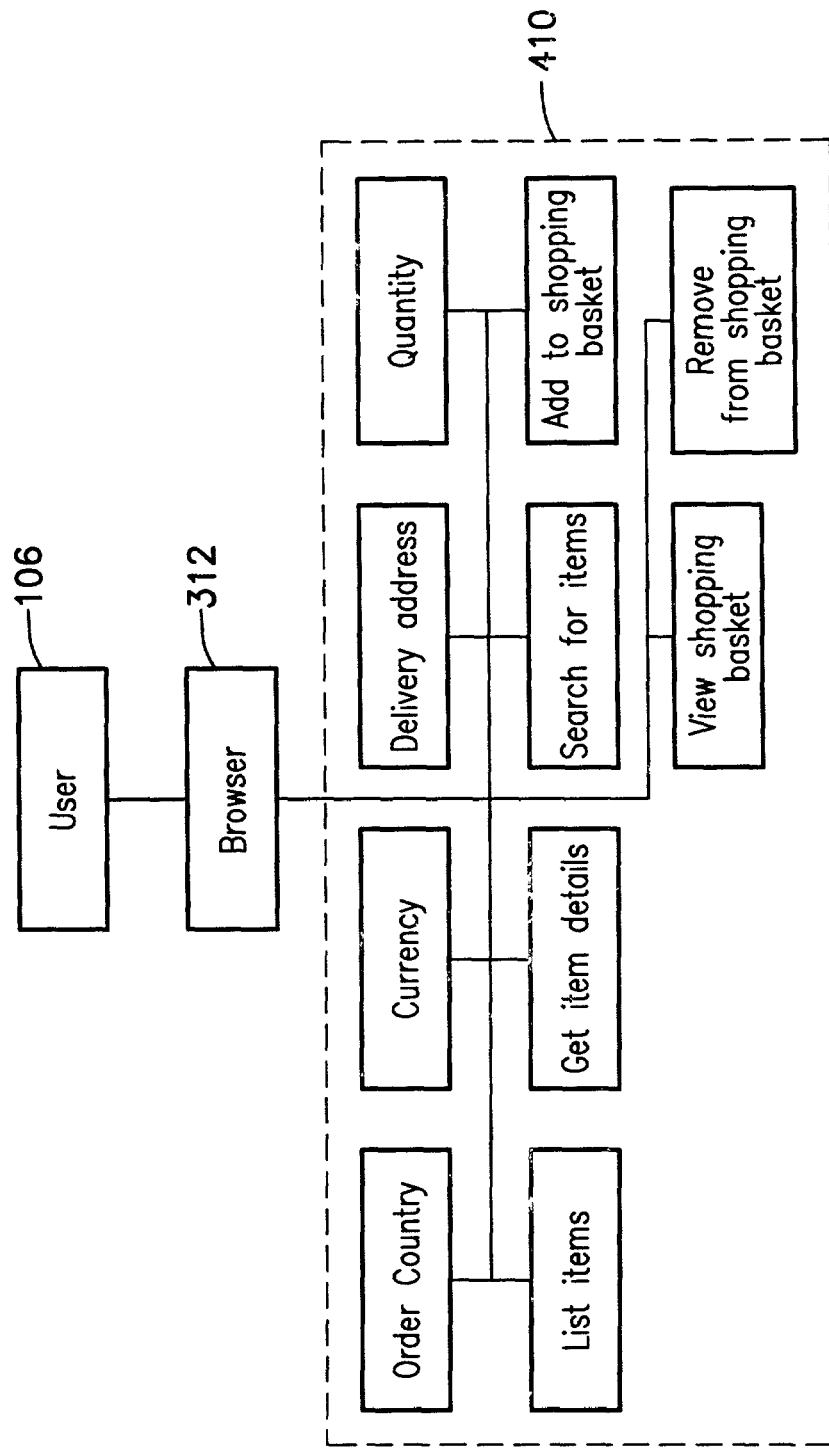
FIG. 4 depicts user selectable functions and options provided by a web-document.

As depicted in FIG. 4, illustratively, users 106 may interact with the web-documents 362 comprising on-line catalog 130 to specify the location of the point of order (the "order country"), select the currency displayed for pricing information, designate a delivery address, list items available for procurement, review details on product information, add and delete selected items to and the electronic shopping basket 140, view items in the electronic shopping basket 140, and perform other functions and select other options. The user-selectable functions and options depicted in FIG. 4 are collectively identified by reference numeral 410.

Figure 5:
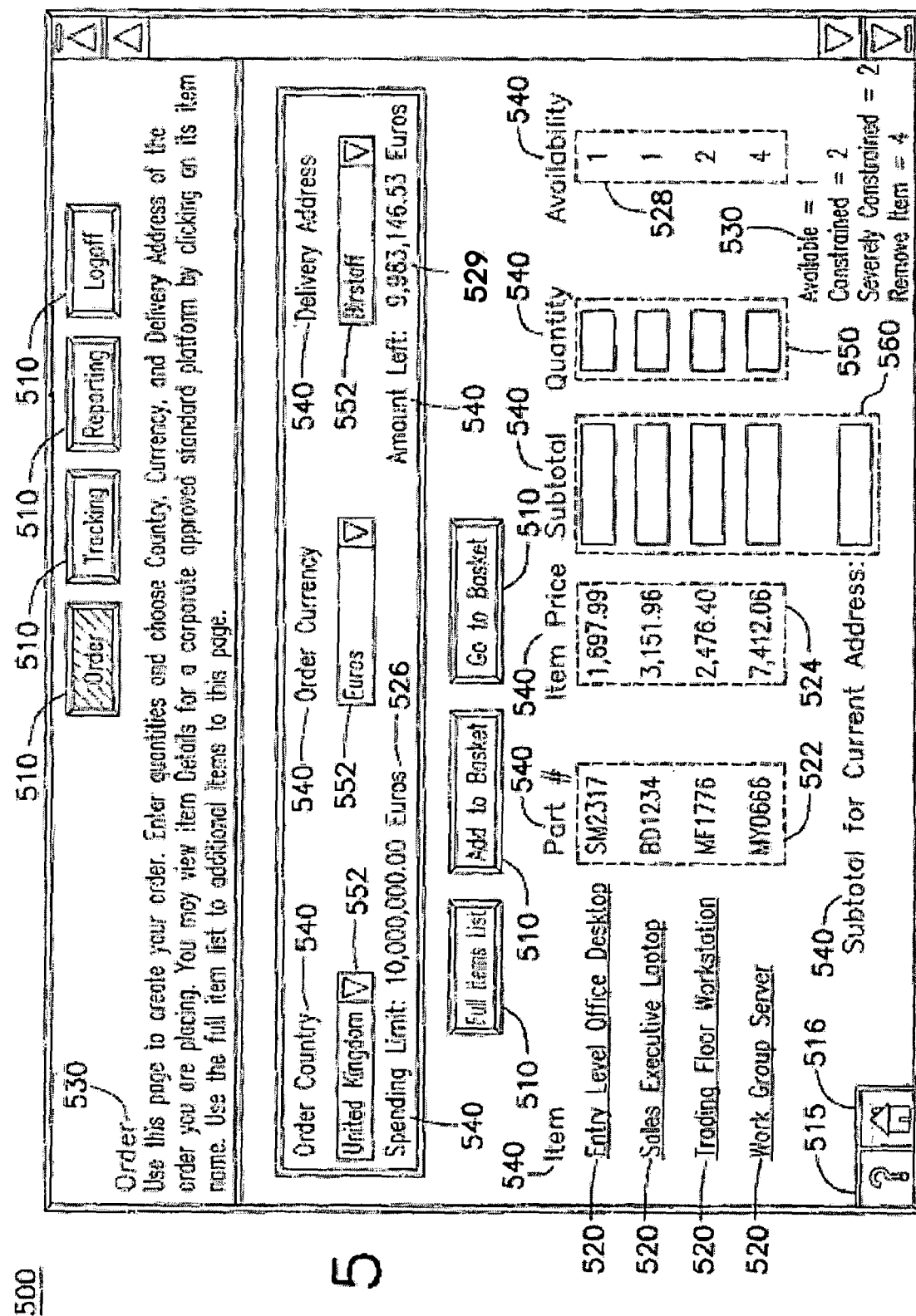
FIG. 5 depicts an illustrative web-document used in e-procurement.

An illustrative web-document 500 employed in this illustrative embodiment and coded using HTML is depicted in FIG. 5. The web-document 500 is a representative one of a plurality of web-pages that constitute the typical on-line catalog used in e-procurement, as most users are accustomed to navigating multiple web-documents. In addition, fewer elements per page may be helpful in streamlining the e-procurement session. However, single page on-line catalogs may be well suited for other e-procurement applications.

The web-document 500 includes both fixed elements that are relatively static such as page design elements, graphics, and text, plus dynamic elements such as product/service information, inventory levels, and pricing. Fixed elements are typically consistently presented to all users, while the dynamic elements vary according to the user and user data (or other factors, as described below). For example, fixed elements establish the look and feel of the page and may include company logos or other graphic elements, informational text, heading, icons, buttons and menus that are designed to interact together to facilitate e-procurement. The fixed elements may be coded into HTML documents and stored in the web-document storage area 362 (FIG. 3).

Buttons 510 and icons 515 are generally fixed elements of web-documents. Web-document 500 includes buttons 510 that when selectively invoked by the user allow the labeled action to occur. Icons are also included such as the HOME icon 516 which would typically connect to the user to the home page of the host 100 (FIG. 1) when activated.

HELP icon 515 (which is labeled with a question mark) may be selected by the user to receive on-line assistance in using e-procurement. In one embodiment, the help button may invoke information that is included in the HTML coding of the page. In this situation, the web-browser 312 (FIG. 3) displays the required assistance to user. In other embodiments, the user is directed to a separate web-documents or HELP web-sites. Selecting the HELP option in this embodiment triggers the establishment of a TCP/IP communication link to another computer if such a link is not already established.

The web-browser client transmits an HTTP POST message directly to a HELP Web site. In these latter two embodiments of the HELP option, the web-browser displays help information included in documents served by a Web-server of the HELP Web site. The help information, for example, describes the use instructions for an e-procurement session or the cause of errors encountered in accessing or conducting a session, offers tips, or illustrates features of e-procurement with pictures and diagrams. On-line help may alternatively be made available to consumers via a hierarchically ordered (topics, subtopics, and sub-subtopics) collection of information residing in memory 316 of user computer 310 (FIG. 3).

Hyperlinks 520 when activated direct the user to other web-documents served by host web-site 300 (FIG. 3). In the illustrative web-document 500, the hyperlinks provide a connection to web-documents that give additional details about the listed items.

Web-document 500 uses informative text 530 to provide instructions and other information to the user. In this illustrative web-document example, the informative text 530 provides both ordering instructions to the user as well as a legend to item availability. Informative text 530, along with headings 540 are examples of fixed elements used by web-document 500.

Web-document 500 also employ data fields 550, 560 that are designed to accept data input by the user that is passed to host web-site 300 (FIG. 3). While data fields 550, 560 in web-document 500 are arranged to receive numerical input, other data fields employed by other web-documents (not shown in FIG. 5) may accept text input. Pull-down menus 552 may also be activated by the user to pass information to host web-site 300, however the information in this case, while selectable by the user, is constrained to pre-set choices.

The dynamic elements placed on the web-document 510 are generated using the catalog construction rules library 364 (FIG. 3), as described in detail below. The dynamic elements will tend to vary by user, company, order country, and other data or information associated with the user. In the illustrative embodiment described in the text accompanying FIG. 1, in the case of information technology, it is foreseen that computer platforms procurable by users will differ according to order country where power requirements and language differ. Thus, the type and/or number of entries in the on-line catalog displayed to a Japanese user will be different from those displayed to a user based in the U.S.

In some e-procurement applications, rather than merely vary content in the on-line catalog according to the user (or vary content according to company, order country, or other data or information), a separate on-line catalog using distinct web-documents is provided for each of the differing users. For example, separate on-line catalogs may be provided in different languages. The selection of the particular language to use may be performed according to user input, or such selection may be performed by the host by retrieving a user profile upon login (when applicable) which indicates a language preference. Alternatively, users may be automatically identified by the IP address sent to the web-server 320 by user computer 310 when accessing the host's web-site 300.

Referring back to FIG. 3, the catalog construction rules library in the host web-site 300 includes methods for creating or retrieving the dynamic web-document elements and serving them to the user computer 310. The methods tell the session controller 322 how to retrieve or create dynamic web-document elements and incorporate them into web-documents for display on the user computer 310. Such methods may include retrieval of key terms such as product information (for example, descriptions, model numbers, etc.) and pricing information, calculation of currency conversions, calculation of shipping and handling costs, retrieval and/or calculation of taxes, tariffs, and duties, retrieval and/or calculation of applicable discounts.

As the dynamic elements themselves may vary according to user data, the methods for retrieval and calculation may vary as well. User data, as used here, means data that is either known about the user (or the user's company), as in a user or company profile, or data that is received from user as in a user-selected option or input.

As the user interacts with the on-line catalog 130 during the progression of an e-procurement session, (by browsing through the web-documents 362 and selecting options to complete the procurement transaction), the dynamic elements of the web-documents 362 will be updated by the host web-site 300 accordingly.

Figure 6:
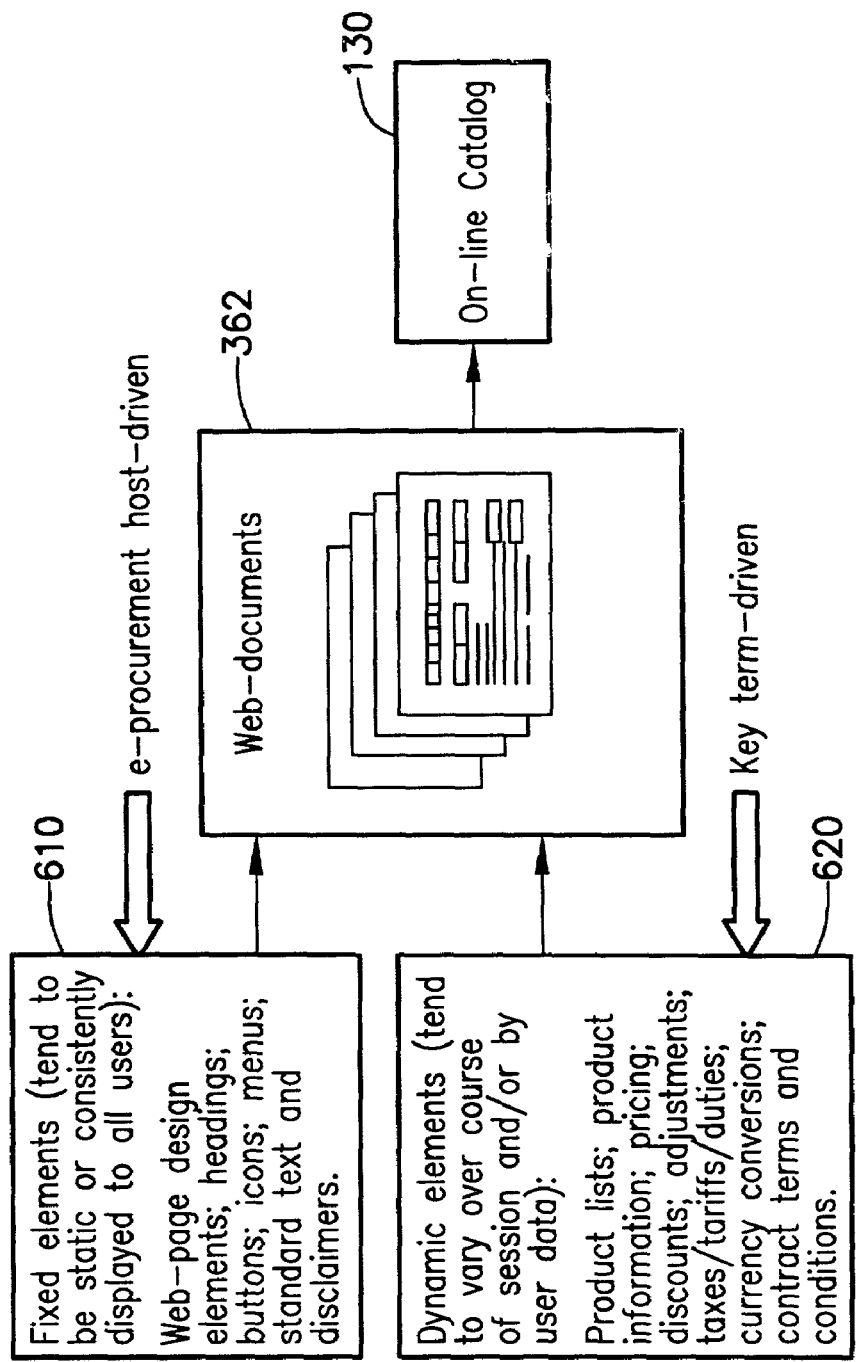
FIG. 6 is a diagram depicting fixed and dynamic elements contained in web-documents.

FIG. 6 depicts the use of fixed and dynamic elements in web-documents forming on-line catalog 130 (FIG. 1). Exemplary fixed web-document elements are indicated by reference numeral 610, while exemplary dynamic elements are noted by reference numeral 620. As indicated, fixed elements are typically controlled or driven by the e-procurement host as the design content, look and feel of the web-based interface is a basic constituent element of the host's business offering to the company. The dynamic elements are characterized as being driven or controlled by the key terms 125, which, as indicated in FIG. 2 and the accompanying text, are created via input by the supplier, company, and fulfillment entities.

Returning again to FIG. 3, the construction of the on-line catalog using rules library 364 relies on a mix of data retrieved from company data storage area 363 and calculated data. Whether data is calculated or more simply retrieved depends on the specific e-procurement application, complexity of contracts 107 (FIG. 1), and other factors. As a general rule, however, calculations may be used when the resultant data is numerical and the methodology used to create it is readily reduced to a mathematical algorithm. In other situations, the resultant data is determined off-line and stored as look-up data that is retrieved as described above.

Session controller 322 is operably coupled to company data storage area 363 and rules library 364 and passes the retrieved or calculated data to web server 320 via line 326 to constitute the completed web-documents with all the required fixed and dynamic elements. Web-documents are authored and served to the user computer 310 in response to user input from selected menu items, icon, buttons, completed data fields and hypertext links, or other associated data such as a user profile. The user continues to interact via browser 312 with the web-server 320 to browse the web-documents forming the on-line catalog 130 (FIG. 1).

Referring back to FIG. 5, web-document 500 lists a number of potentially procured items. The listed items 520, as dynamic elements, are selected for display according to the key terms 125 (FIGS. 1 and 3) to be consistent with terms of contracts 107 (FIG. 1). However, the listed items may be a subset of all approved line items and further, may include unapproved line items. The particular criteria and method used for selecting listed items 520 may vary according to e-procurement application. The criteria and selection method are stored in rules library 363 (FIG. 3) as described above.

By way of example, the four listed items 520 may represent a subset of the full set of approved line items sourced from OEM 110$_1$ (FIG. 1), as they may be the only items available for procurement in the user-designated order country of the United Kingdom. Alternatively, the listed items 520 may be selected as being the subset of the set of approved line items from OEM 110$_1$ that meet a particular corporate standard computing platform or in-country business rule, law or regulation (for example, the part numbers shown may designate computer bundles that include low-emission monitors). The listed items 520 may also be selected as a result of user input or data such as a user profile or authorization schedule which indicates to the host web-site 300 that the user may only be interested or authorized to procure information technology, but not related items such as office furniture (which is also an approved line item in this example).

Web-document 500 displays other dynamic elements including part numbers 522, set spending limits 526, available spending amount 529, inventory or item availability information 528, and item pricing 524 as indicated in FIG. 5.

As described above with listed items 520, these other elements are selected according to variable criteria and selection methodologies.

The user may designate the desired procured quantity for each of the listed items 520 by entering data into the data field 550. The quantity data is passed to host web-site 300 (FIG. 3) so that appropriate net selling or delivered pricing may be determined.

Session controller 322 is operably coupled to order controller 324 as shown in FIG. 3. Order controller 324 is used to implement the electronic shopping basket feature and receives user information returned to the host web-site 300 in response to the displayed web-documents. Order controller 324 is also used, as described in detail below, to implement the order tracking and reporting features.

As shown in FIG. 5, web-document 500 displays an ADD TO BASKET button which may be selected by the user. The ADD TO BASKET option may invoked by the user to store displayed product/service information in the electronic shopping basket 140 (FIGS. 1 and 3). When invoking this option, the user's web-browser 312 issues an HTTP POST message to web-server 320 indicating that the user wishes to add the displayed product/service information to the electronic shopping basket 140. The web-server 320 passes the message to order controller 324 which retrieves the product/service information from company data storage area 363 and stores it in electronic shopping basket 140 as depicted in FIG. 3.

Figure 8:
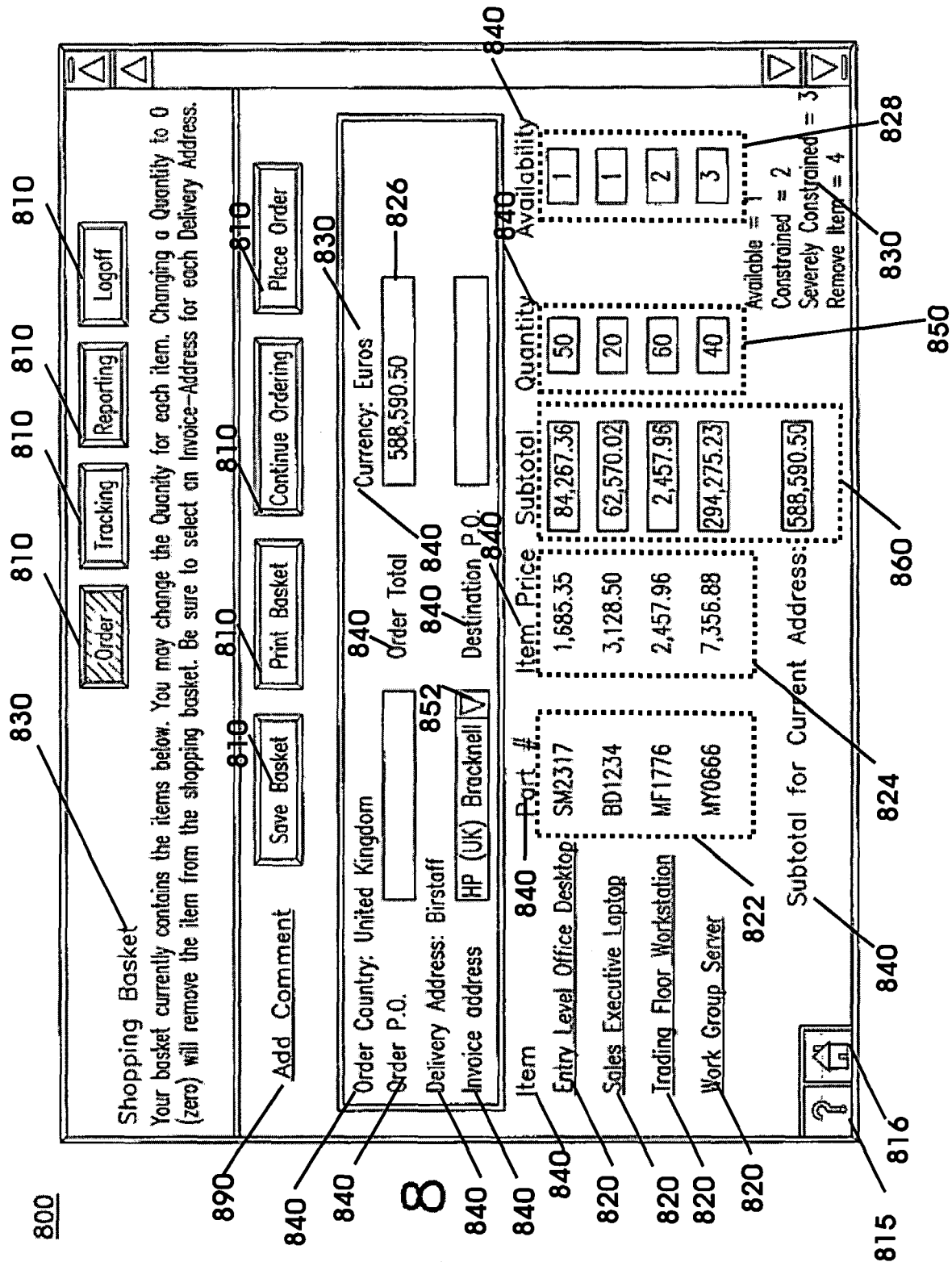

The information stored in electronic shopping basket 140 may be utilized as a dynamic element in the web-document representation of the electronic shopping basket. The shopping basket web-document 800 is depicted in FIG. 8. The shopping basket web-document 800 is similar in form and design to web-document 500 depicted in FIG. 5. Buttons 810, icons 815 and 816, informative text 830, and other fixed elements are displayed and fields 860, 826, 828 and 850 are provided for the display of dynamic elements. Web-document 800 displays other dynamic elements including part numbers 822, order total 826, quantity 850, inventory or item availability information 828, and item pricing 824 as indicated in FIG. 8.

Figure 7:
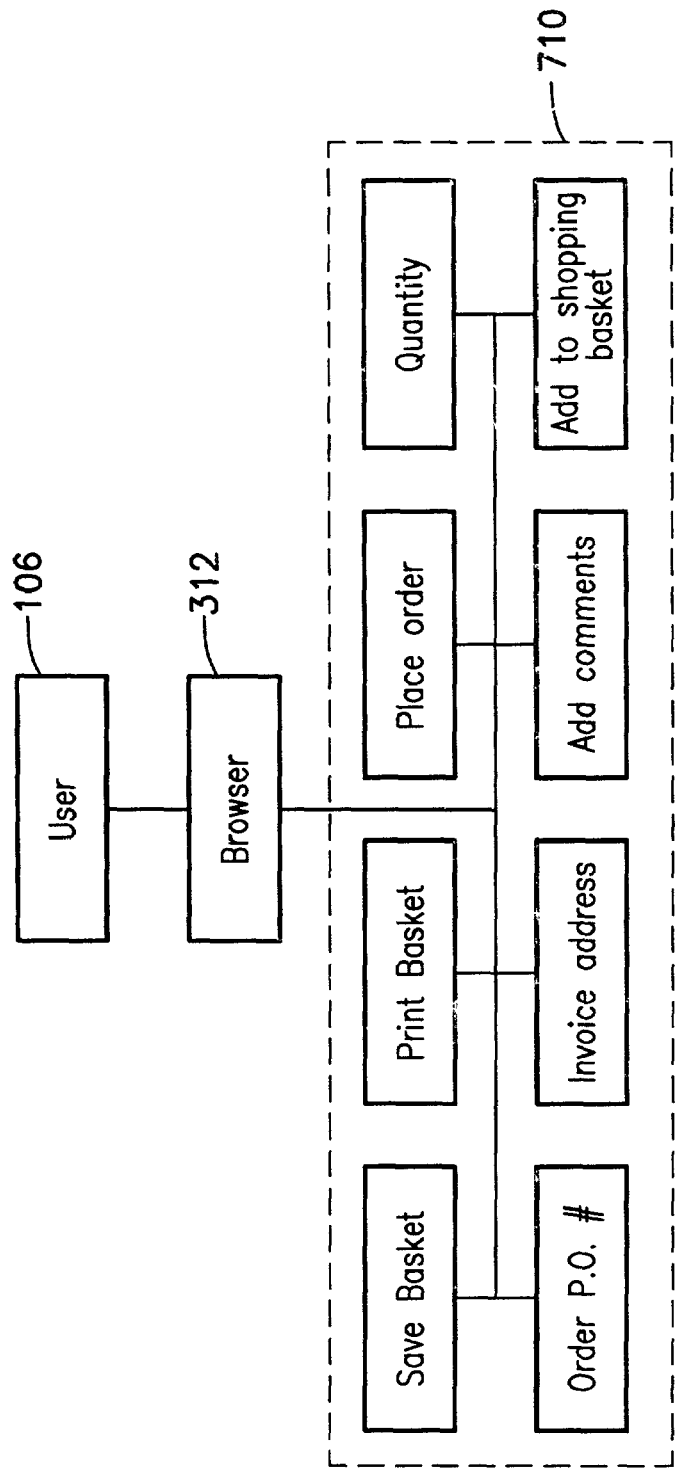
FIG. 7 depicts user selectable functions and options provided by a web-document that implements electronic shopping basket functions.

FIG. 7 summarizes the user options with the electronic shopping basket feature of e-procurement. As depicted in FIG. 7, illustratively, users 106 (FIG. 1) may interact with the web-document 800 to save the contents of the electronic shopping basket 140, print the contents of the electronic shopping basket 140 to a local printer connected to user computer 310 (FIG. 3), place a procurement order with host web-site 300 (FIG. 3), designate quantities, purchase order numbers and invoice addresses, add items to the electronic shopping basket 140, and address comments or other information to host web-site 300. The user-selectable functions and options depicted in FIG. 7 are collectively identified by reference numeral 710.

The user interacts with shopping basket 140 using web-document 800. As the user designates desired quantities for each of the listed items 820, net selling prices 824 are determined and displayed as shown. In this illustrative embodiment, a discount is provided by an OEM which is reflected by contract 107 and key terms 125 (FIG. 1) for volume purchases. Thus, the net selling prices 824 are lower than the item prices 524 indicated in FIG. 5. Net selling prices 824 may be determined via calculation or retrieved from a look-up table as described above.

Users may interact with host web-site 300 through the ADD COMMENT option which is provided, in the illustrative web-document 800, as a hyperlink 890. Activating hyperlink 890 connects the user to another web-document which may be designed to accept user comments, questions, or other input.

FIG. 9 depicts an illustrative web-document 900 that may be used to review and confirm a user's order. Web-document 900 has similar fixed and dynamic elements to those in web-documents 500 and 800. Web-document 900 provides the user with options to RETURN TO BASKET to make changes to an order or to CONFIRM ORDER via buttons 910 and 920, respectively. Once confirmed, the order information is collected by host web-site 300 (FIG. 3) and forwarded to vendor 150 for fulfillment via order controller 324 as described above.

FIG. 10 depicts an illustrative web-document 1000 that confirms the user's order and assigns an e-procurement session tracking number 1009. The user is provided with the options of placing additional orders or logging off the e-procurement session by using the appropriate buttons 1020 and 1030, PLACE NEW ORDER and LOGOFF, respectively.

The session tracking number 1009 provided to the user uniquely identifies a particular transaction in a e-procurement session. As noted in the introductory overview, order tracking is often desired by companies to help manage costs. The order controller 324 assigns the number so that fulfillment status and other indicia, including in-progress order and previously fulfilled order information, may be collected and reported to the user or company upon request.

Figure 11:
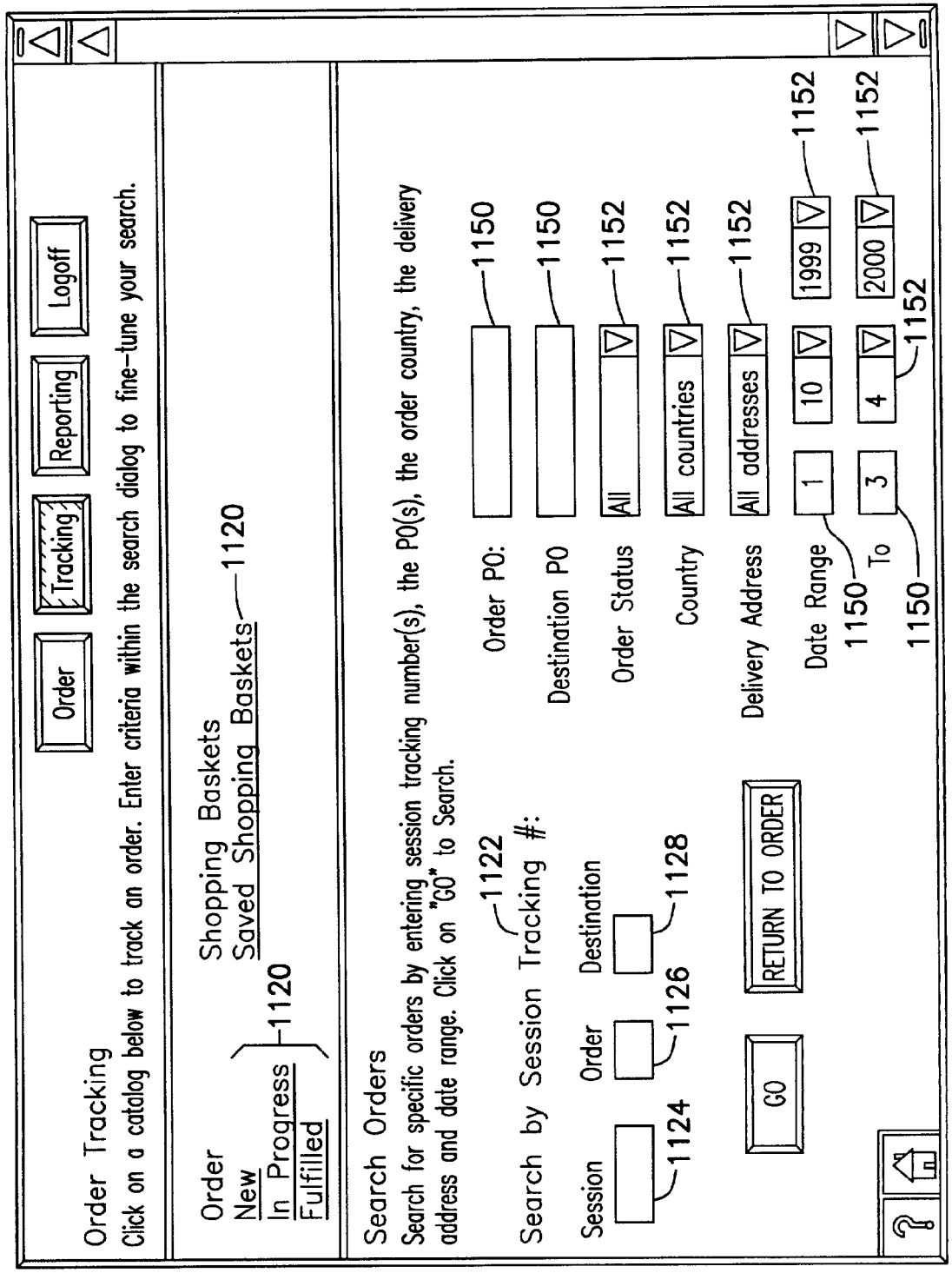

Users may inquire as to status by using the session tracking number 1009. As shown in FIG. 11, illustrative web-document 1100 provides tools for the user to select search criteria and other parameters to assist in order tracking. Web-document 1100 may be displayed to the user when the ORDER TRACKING button (shown on FIGS. 5, 7, 8-10) is activated. As shown, various hyperlink categories 1120 may be selected to search new, in-progress or fulfilled orders, or previously saved shopping baskets.

Users may perform searches, as indicated by heading 1122, by completing fields 1124, 1126, and 1128, for session, order, and destination information, respectively. Fields 1150 and pull down menus 1152 are also provided for user input by purchase order number, destination purchase order number, delivery address, and date range, as indicated in FIG. 11.

Figure 12:
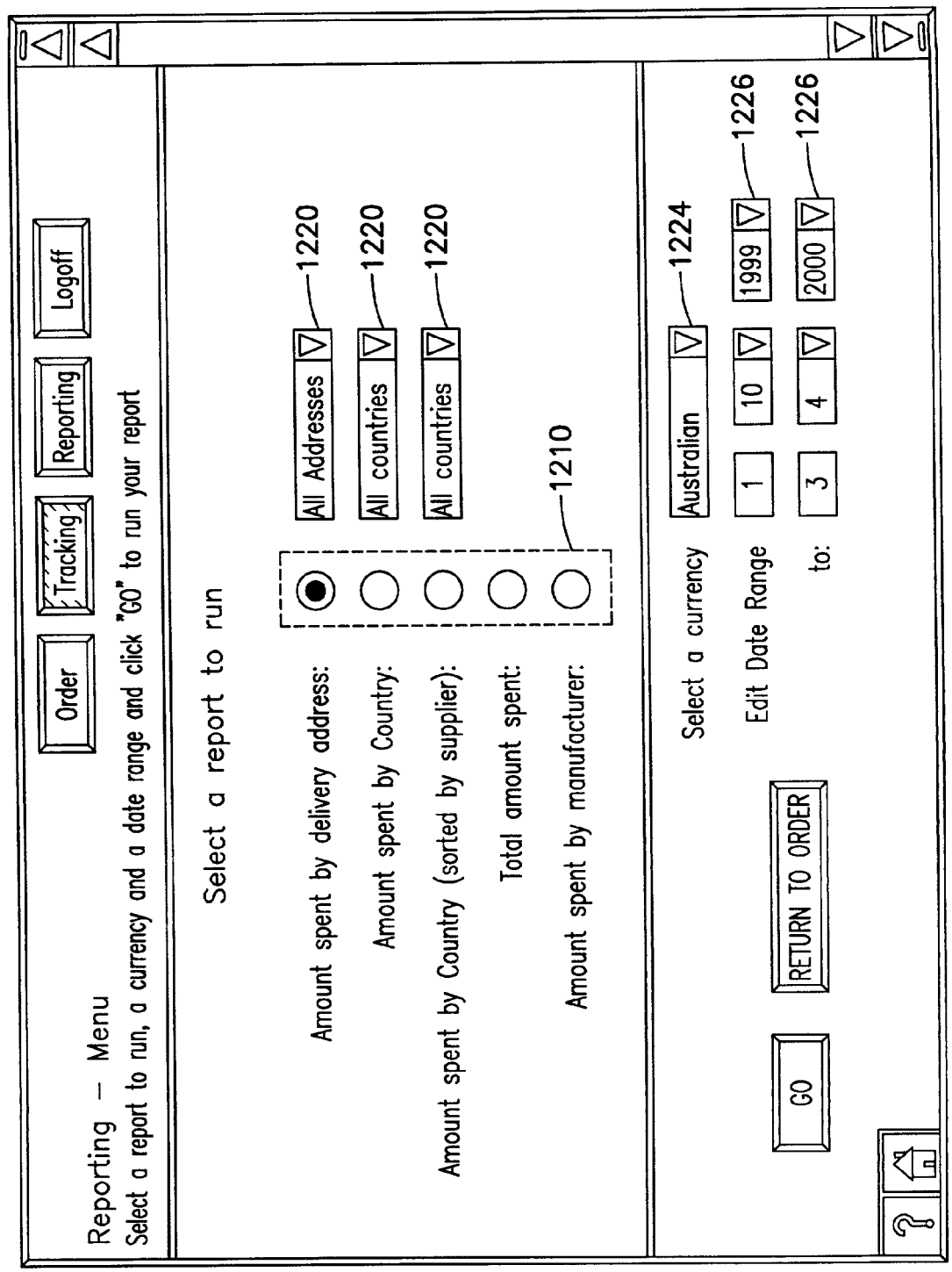

FIG. 12 depicts an illustrative web-document 1200 that provides the user with options to run reports pertaining to the user's or company's e-procurement transaction history. The company's ability to track spending levels and delivery performance across a range of products and a multitude of suppliers is useful to audit compliance with contract terms. Check boxes 1210 and pull-down menus 1220 may activated by the user to select a desired report to run.

Referring to FIG. 3, the selected report request is sent by user computer 310 via web browser 312 to the host web-site 300 which is fulfilled under the control of order controller 324 which pulls the required information from data storage device 360. As shown in FIG. 12, currency used in the report plus date ranges for the reported e-procurement transactions may be specified by the user in menu 1224 and data field/menu 1226, respectively. Reports run by host web-site 300 in response to user requests can be provided on-line to the user in a browsable format, or run off-line and supplied to the user or the company through conventional delivery channels.

Figure 13:
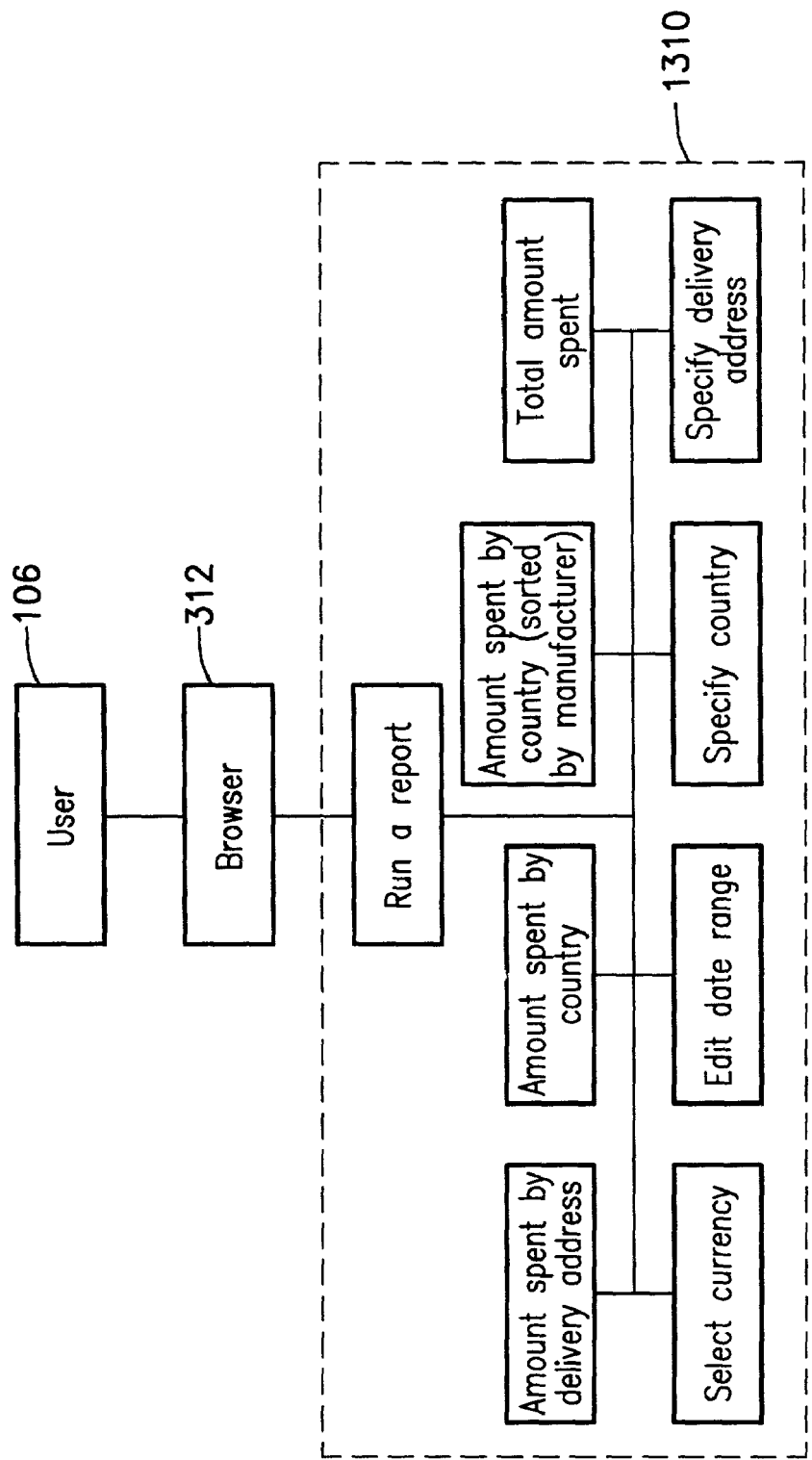
FIG. 13 depicts user selectable functions and options provided by a web-document that implement reporting functions.

FIG. 13 summarizes the user selectable options for report generation (designated collectively by reference numeral 1310) provided by web-document 1200. As indicated, users may run reports according to a number of different parameters.

Figure 14:
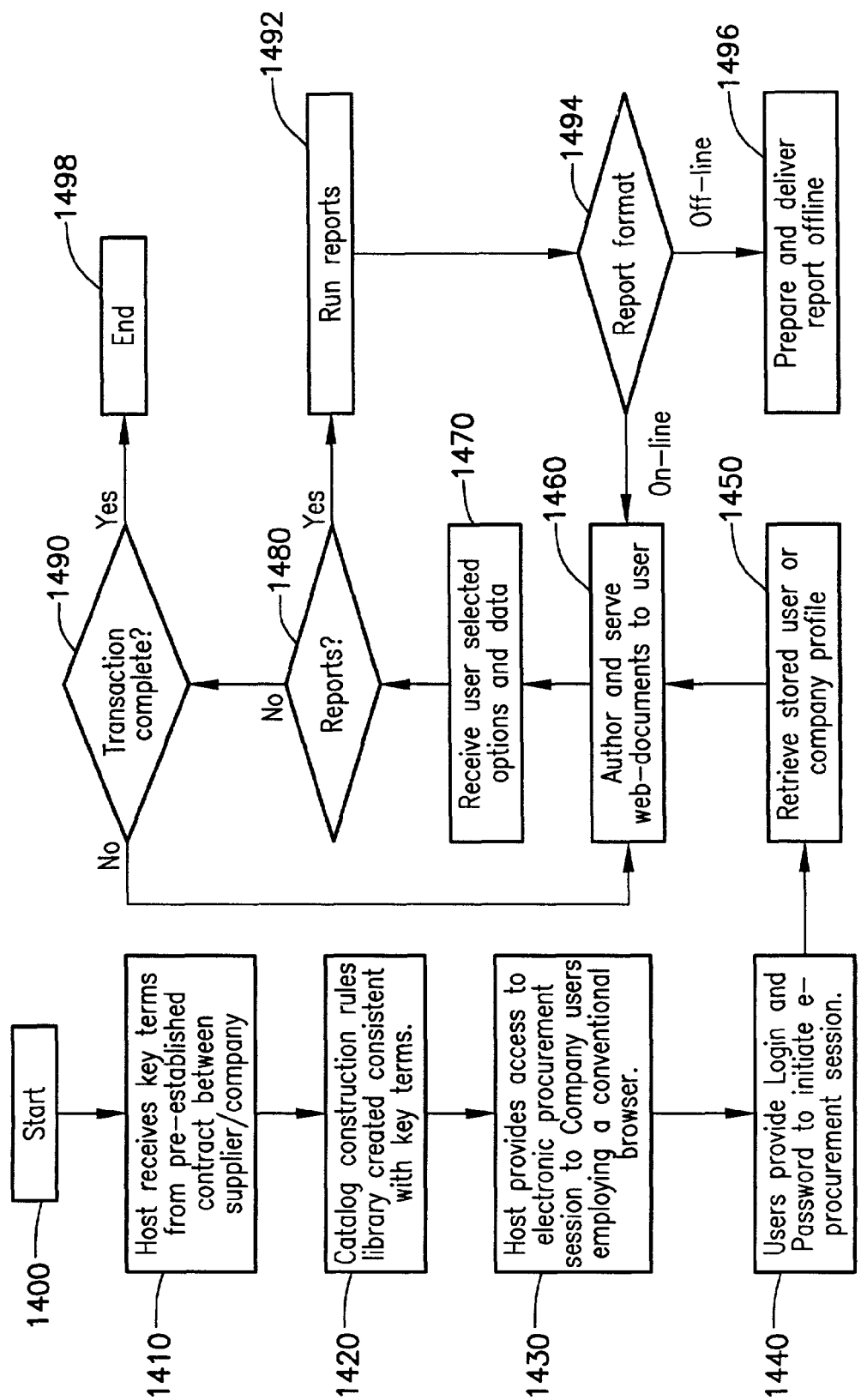
FIG. 14 is a flow chart depicting an illustrative e-procurement set-up and session with a company user.

FIG. 14 is a flow chart depicting an illustrative e-procurement set-up and session with a company user. The process enters at block 1400. The e-procurement host receives key terms from a pre-established contract between a supplier and a company as indicated in block 1410. From the key terms, a catalog construction rules library, as depicted by block 1420, is created to provide methods used by the host prior and during an on-line e-procurement session to author and serve web-documents that are appropriate to user data or requests.

Access is provided to the company and users as indicated in block 1430. Upon initiation of an e-procurement session by a user, in block 1440, login and password credentials are solicited by the host and provided by the user. As discussed previously, the use of login and password credentials may be used to maintain security and protect sensitive company information.

A company or user profile may be retrieved, in block 1450, to provide a specific or user/company-tailored on-line catalog or web-page. Such profiles may typically include general information about the user such as location, position, contact information, and the like. In addition, service-specific information regarding the user may also be included in the profile, such as demographic and user-identified preference information, to facilitate the host in tailoring the e-procurement transaction to fit a particular user.

Profiles may be generated prior to the start of an e-procurement session, or created during the session. Profile data may be updated to create a user transaction history which may be helpful to both the company and host. The company may use the user transaction history to audit job performance, for example. The host may find such user transaction histories helpful, for example, for purposes of quality control and improvement of the hosted e-procurement sessions.

At block 1460, web-documents are authored and served to the user. Some web-documents may be authored in advance of the e-procurement session while others may be authored during the session. The balance between pre-authored and on-line authored will vary according to application, number and complexity of key terms and other factors. At block 1470, user data and input is generated, for example, through user activated options and completed data fields contained in the web-documents displayed by the user's web-browser.

At decision block 1480, if a report is required by the user, then control transfers to block 1492 and on-line or offline reporting is performed according to selected report formats. At decision block 1494, if on-line reporting is employed, then control is returned to block 1460 and the appropriate web-document with desired report information is authored and served to the user. If on-line reporting is employed, then off-line reports are prepared and delivered to the user as indicated in block 1496.

If the result from decision block 1480 is no report, then control transfers to decision block 1490. If the e-procurement transaction is completed, then the process ends at block 1498. If the e-procurement session needs to continue, then control returns back to block 1460. The process of authoring and serving web-documents to the users continues in an iterative manner until the transaction is completed.

Other embodiments are within the following claims.

What is claimed is:

1. A method of providing electronic procurement to a purchasing entity comprising:
   accessing a database containing variable elements of an on-line catalog, the elements including items suppliable by a vendor;
   constructing an electronic catalog having one or more pages by selecting elements to be included in the pages, and providing commercial terms applicable to the included elements, where the selecting and providing steps are performed consistent with contract terms between the purchasing entity and the vendor, wherein said commercial terms include both intrinsic terms and extrinsic terms;
   providing electronic access to the catalog to users authorized by the purchasing entity;
   providing an interface to one or more documents that an authorized user can access, which one or more documents include the commercial terms applicable to a set of elements selectable by the user;
   providing a selected page of the catalog to the user in response to user input; and
   forwarding an order to a vendor for fulfillment, wherein the order includes the intrinsic and extrinsic terms required to satisfy the order.

2. A system for an electronic procurement site comprising:
   a database including a plurality of variable elements of an on-line catalog, the elements including items suppliable by a vendor;
   a server coupled to the database providing an access interface to access and read from said database, said server providing an interface to one or more documents that an authorized user can access, which one or more documents include the commercial terms applicable to a set of elements selectable by the user; and
   a computer readable media having encoded thereon a plurality of web documents forming pages of an electronic catalog, the web documents generated from elements selected in accordance with contract terms between a purchasing entity and the vendor, and at least one web document containing commercial terms applicable to the selected elements, wherein said commercial terms include both intrinsic terms and extrinsic terms;
   wherein said server provides electronic access to the catalog to users authorized by the purchasing entity and forwards an order by the user to a vendor for fulfillment, wherein the order includes the intrinsic and extrinsic terms required to satisfy the order.

3. A method of providing electronic procurement to a purchasing entity comprising:
   accessing a database containing dynamic elements of an on-line catalog, the elements including items suppliable by a vendor;
   constructing an electronic catalog having one or more pages by selecting elements to be included in the pages, and generating commercial terms applicable to the included elements;
   where the selecting and generating steps are performed in accordance with contract terms between the purchasing entity and the vendor, wherein said commercial terms include both intrinsic terms and extrinsic terms;
   providing electronic access to the catalog to users authorized by the purchasing entity;
   providing an interface to one or more documents that an authorized user can access, which one or more documents include the commercial terms applicable to a set of elements selectable by the user;
   accepting browsing commands from the user to display catalog pages selected by the user;
   providing an electronic shopping basket function configured to hold the identification of items chosen by the user from the displayed catalog pages;
   sending contents of the electronic shopping basket to a vendor for fulfillment of the identified items to the purchasing entity in accordance with the contract terms, wherein the sending includes sending both the intrinsic and extrinsic terms required to satisfy the order; and collecting a fee from the purchasing entity that is based on the value of the contents of the electronic shopping basket.

4. A method of hosting an electronic procurement site ("e-procurement") by a host, the method comprising:

providing an web-based interface for a user to access the e-procurement site;

identifying the user's level of authorization when accessing the site to thereby engage in an e-procurement session with the host;

generating a plurality of web pages to form a user-specific catalog which includes a set of deliverables that may be supplied by a supplier to a purchasing entity, wherein items contained in the set of deliverables and commercial terms for the supply of the deliverables are determined between the supplier and the purchasing entity in advance of the e-procurement session, wherein said commercial terms include both intrinsic terms and extrinsic terms;

providing an interface to one or more documents that an authorized user can access, which one or more documents include the commercial terms applicable to a set of deliverables selectable by the user;

connecting the user through the web-based interface to catalog pages selected in response to the authorization level; and forwarding an order from a user to a vendor for fulfillment, wherein the order includes the intrinsic and extrinsic terms required to satisfy the order.

5. A method of fulfilling electronic orders, the method comprising:

providing a user electronic access to a catalog of deliverables that may be ordered by the user where the catalog is constructed according to terms of a contract for purchase and sale of deliverables between a purchasing entity and a supplier, wherein said terms include both intrinsic terms and extrinsic terms;

providing an interface to one or more documents that an authorized user can access which one or more documents include the commercial terms applicable to a set of deliverables selectable by the user;

accepting browsing commands from the user to display catalog pages selected by the user;

providing an electronic shopping basket function configured to hold the identification of items chosen by the user from the displayed catalog pages; and sending contents of the electronic shopping basket to a vendor for fulfillment of the identified items to the purchasing entity in accordance with the contract terms, wherein said sending includes sending both the intrinsic and extrinsic terms required to satisfy the order.

6. A method of hosting an electronic procurement site ("e-procurement") by a host comprising:

providing an web-based interface for a user to access the e-procurement site to thereby engage in an e-procurement session with the host;

receiving user information when accessing the site;

generating one or more web-page listing items and prices associated with the listed items suppliable by an OEM to a purchasing entity, where the listed items and prices are determined between the OEM and the purchasing entity in advance of the e-procurement session, wherein said generating includes using commercial terms of a pre-established contract between the OEM and the purchasing entity, and the commercial terms include both intrinsic terms and extrinsic terms;

connecting the user through the web-based interface to selected ones of the user-specific web-page where the selection is performed in response to the user information;

providing an interface to one or more documents that an authorized user can access, which one or more documents include the commercial terms applicable to a set of items selectable by the user;

accepting an order for a listed item at the associated price from the user;

forwarding the order to a VAR for fulfillment of the ordered listed item at the associated price to the purchasing entity, wherein the order includes both the intrinsic and extrinsic terms required to fulfill the order;

tracking the order on demand from the user; and reporting the status of the tracked order on demand from the user.

7. A method of providing electronic procurement from a host to a user within an organization comprising:

constructing a set of purchasable items incorporating a pre-established standard of the organization, wherein said pre-established standard includes both intrinsic terms and extrinsic terms;

providing an electronic interface between the host and the user;

providing an interface to one or more documents that an authorized user can access, which one or more documents include the commercial terms applicable to a set of items selectable by the user;

determining a subset of items for display to the user, and associated data for each of the displayed items, consistent with the pre-established standard; and forwarding an order for selected ones of the displayed items selected by the user to a vendor where the vendor and host agreed in advance of the forwarding that the order will be fulfilled in accordance with the pre-established standard, wherein the order includes both the intrinsic and extrinsic terms required to fulfill the order.

8. A method of providing automated procurement from a host to a user within an organization comprising:

constructing a set of items purchasable by the organization in accordance with terms of a pre-established contract between an original equipment manufacturer and the organization, wherein said contract includes both intrinsic terms and extrinsic terms;

providing an web-based interface between the host and user for user access to displayable web-pages;

wherein said web-based interface provides an interface to one or more documents that an authorized user can access, which one or more documents include the commercial terms applicable to a set of items selectable by the user;

determining, in response to user request for access, a subset of items for display on web-pages and associated pricing for each item in the subset consistent with the contract and both the intrinsic terms and extrinsic terms; and forwarding an order for user-selected ones of the items in the subset to a value added reseller where the value added reseller and host agree in advance of the forwarding that the order will be fulfilled in accordance with the terms of the contract, wherein the order includes both the intrinsic and extrinsic terms required to fulfill the order.

9. A system for enabling automated procurement between a host and a user within an organization comprising:

a database containing a set of items purchasable by the organization in accordance with pre-established terms of a contract between an original equipment manufacturer and the organization and further containing decision rules derived from the contract terms, wherein said contract terms include both intrinsic terms and extrinsic terms;

a server providing a web-based interface for electronic communication between the host and the user, said server providing an interface to one or more documents that an authorized user can access, which one or more documents include the commercial terms applicable to a set of items selectable by the user;

a processor coupled to the database for determining a subset of items for display on web-pages at the user's location and associated pricing for each item in the subset in accordance with the rules and user instructions received through the interface; and a communications link coupled to the processor for forwarding an order for user-selected ones of the items in the subset to a value added reseller where the value added reseller and host and agree in advance of the forwarding that the order will be fulfilled in accordance with the terms of the pre-established contract, wherein the order includes both the intrinsic terms and extrinsic terms required to fulfill the order.

10. A method of providing web-based procurement from a host to a user within an organization comprising:

constructing a set of items purchasable by the organization in accordance with pre-established terms of a contract between an original equipment manufacturer and the organization, wherein said terms include both intrinsic terms and extrinsic terms;

providing an web-based interface between the host and the user; in response to user instructions received through the interface, determining a subset of items for display on web-pages and associated pricing for each item in the subset consistent with the contract, said web-based interface providing an interface to one or more documents that an authorized user can access, which one or more documents include the commercial terms applicable to a set of items selectable by the user;

sending the subset of items and associated pricing for display on web-pages, the currency for the displayed associated pricing being selectable by the user;

accepting an order for user-selected ones of the items in the subset where the user-selecting function and total monetary value of the order is subject to limits authorized by the organization; and forwarding the accepted order to a value added reseller where the value added reseller and host and agree in advance of the forwarding that the order will be fulfilled in accordance with the terms of the contract, wherein the order includes both the intrinsic terms and extrinsic terms required to fulfill the order.

11. A method of fulfilling electronic ordering comprising:

constructing a catalog of a set of deliverables, members included within the set and prices associated with each member are established between a purchasing entity and a supplier prior to the electronic ordering, wherein said constructing includes using both intrinsic terms and extrinsic terms of an agreement between the purchasing entity and supplier;

providing an interface to one or more documents that an authorized user can access, which one or more documents include the commercial terms applicable to a set of deliverables selectable by the user;

making the constructed catalog available on-line to users authorized by the purchasing entity;

receiving orders for the deliverables from the authorized users; and generating, from the received orders, purchase orders to a vendor to initiate fulfillment of the ordered deliverables to a location designated by the user or purchasing entity in accordance with the established terms, wherein the purchase orders include both the intrinsic terms and extrinsic terms required to fulfill the order.

* * * * *